(12) United States Patent
Sugimura et al.

(10) Patent No.: US 10,509,986 B2
(45) Date of Patent: Dec. 17, 2019

(54) IMAGE SIMILARITY DETERMINATION APPARATUS AND IMAGE SIMILARITY DETERMINATION METHOD

(71) Applicant: FUJITSU LIMITED, Kawasaki-shi, Kanagawa (JP)

(72) Inventors: Masahiko Sugimura, Kawasaki (JP); Yasutaka Moriwaki, Kawasaki (JP); Susumu Endo, Kawasaki (JP); Hiroaki Takebe, Kawasaki (JP); Takayuki Baba, Kawasaki (JP); Yusuke Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 31 days.

(21) Appl. No.: 16/025,367

(22) Filed: Jul. 2, 2018

(65) Prior Publication Data
US 2019/0012572 A1  Jan. 10, 2019

(30) Foreign Application Priority Data

Jul. 6, 2017  (JP) .................................. 2017-132495

(51) Int. Cl.
*G06K 9/62* (2006.01)
*G06K 9/46* (2006.01)
*G06K 9/38* (2006.01)

(52) U.S. Cl.
CPC ............. *G06K 9/6215* (2013.01); *G06K 9/38* (2013.01); *G06K 9/4647* (2013.01);
(Continued)

(58) Field of Classification Search
CPC ...... G06K 9/6215; G06K 9/38; G06K 9/4647; G06K 9/6202; G06K 9/4652; G06K 2009/6213; G06K 9/00624
See application file for complete search history.

(56) References Cited

U.S. PATENT DOCUMENTS

| 2006/0110029 | A1* | 5/2006 | Kazui | ................ G06K 9/00228 |
| | | | | 382/159 |
| 2012/0045094 | A1* | 2/2012 | Kubota | ................ G06K 9/3233 |
| | | | | 382/103 |
| 2016/0267320 | A1* | 9/2016 | Ohta | ....................... G06T 5/005 |

FOREIGN PATENT DOCUMENTS

| JP | 2011-134117 | 7/2011 |
| JP | 2015-149008 | 8/2015 |

OTHER PUBLICATIONS

M. Calonder et al., "BRIEF: Binary Robust Independent Elementary Features", In Proceedings of the European Conference on Computer Vision (ECCV) 2010, Part IV, LNCS 6314, pp. 778-792 (15 pages).

(Continued)

*Primary Examiner* — Menatoallah Youssef
(74) *Attorney, Agent, or Firm* — Fujitsu Patent Center

(57) ABSTRACT

An image similarity determination apparatus includes a memory and a processor configured to acquire a first image and a second image, perform selection of a first group and a second group from a plurality of feature points included in the first image and perform selection of a third group and a fourth group from a plurality of feature points included in the second image, calculate feature quantity for each feature point included in the first group and the third group on the basis of luminance and calculate feature quantity for each feature point included in the second group and the fourth group on the basis of hue, and determine similarity between the first image and the second image on the basis of both first comparison of the first group with the third group and second comparison of the second group with the fourth group.

18 Claims, 21 Drawing Sheets

(52) U.S. Cl.
CPC ......... *G06K 9/4652* (2013.01); *G06K 9/6202* (2013.01); *G06K 2009/6213* (2013.01)

(56) References Cited

OTHER PUBLICATIONS

K. E. A. Van De Sande et al., "Color Descriptors for Object Category Recognition" (2008), 4 pages.

* cited by examiner

FIG. 4

| ID | COORDINATES OF PIXEL PAIR ||
|---|---|---|
| | FIRST PIXEL (s,t) | SECONDPIXEL (u,v) |
| 1 | ( 5, 4 ) | ( 30, 12 ) |
| 2 | ( 15, 7 ) | ( 20, 10 ) |
| 3 | ( 5, 22 ) | ( 13, 10 ) |
| 4 | ( 28, 15 ) | ( 5, 0 ) |
| ⋮ | ... | ... |
| 128 | ( 0, 5 ) | ( 10, 15 ) |

| ID | COORDINATES | LUMINANCE ABSOLUTE VECTOR | LUMINANCE NORM | HUE ABSOLUTE VECTOR | HUE NORM |
|---|---|---|---|---|---|
| 1 | ( X1, Y1 ) | 00101011... | 8 | 00101011... | 31 |
| 2 | ( X2, Y2 ) | 10011010... | 87 | 10011010... | 3 |
| 3 | ( X3, Y3 ) | 01101100... | 33 | 01101100... | 91 |
| 4 | ( X4, Y4 ) | 10010000... | 101 | 10010000... | 99 |
| ⋮ | ⋮ | ⋮ | ⋮ | ⋮ | ⋮ |

| ID | COORDINATES | LUMINANCE FEATURE QUANTITY |
|---|---|---|
| 1 | ( X1, Y1 ) | 010100... |
| 2 | ( X2, Y2 ) | 011011... |
| 3 | ( X8, Y8 ) | 100100... |
| 4 | ( X9, Y9 ) | 101011... |
| ⋮ | ⋮ | ⋮ |

115

| ID | COORDINATES | HUE FEATURE QUANTITY |
|---|---|---|
| 1 | ( X3, Y3 ) | 100101... |
| 2 | ( X4, Y5 ) | 100110... |
| 3 | ( X6, Y7 ) | 011000... |
| 4 | ( X8, Y8 ) | 100011... |
| ⋮ | ⋮ | ⋮ |

IMAGE SIMILARITY DETERMINATION APPARATUS AND IMAGE SIMILARITY DETERMINATION METHOD

CROSS-REFERENCE TO RELATED APPLICATION

This application is based upon and claims the benefit of priority of the prior Japanese Patent Application No. 2017-132495, filed on Jul. 6, 2017, the entire contents of which are incorporated herein by reference.

FIELD

The embodiments discussed herein are related to an image similarity determination technique.

BACKGROUND

In recent years, an image matching technique has been widely used in various fields. According to one exemplified image matching method, a local feature quantity at a feature point in a first image is compared with a local feature quantity at a feature point in a second image to search for the feature point in the second image (hereinafter referred to as "correspondence point") that corresponds to the feature point in the first image. A set of correspondence points found by search may be statistically processed to recognize the presence of the first image in the second image, and the position of the first image.

The local feature quantity used in the above-mentioned search for the correspondence point may be represented in a binary code. Its typical example is BRIEF (Binary Robust Independent Elementary Features). For each of a plurality of pixel pairs disposed around the feature point, BRIEF is expressed as the local feature quantity calculated based on a luminance difference between pixels. More specifically, a set of bit values (binary code) each corresponding to a sign (positive and negative) of a luminance difference between pixels is calculated as the local feature quantity. According to such method of expressing the local feature quantity as the binary code, the degree of similarity between feature points may be advantageously calculated by high-speed calculation using Hamming distance.

A following image processing technique using the feature quantity has been proposed. For example, a proposed object region extraction apparatus receives a specified region including a predetermined object from an image, extracts a feature quantity of the predetermined object using either a hue component or a brightness component in the specified region, and corrects the position of the object in the specified region using the feature quantity. Further, a proposed authentication system stores each feature point in an image to be authenticated, a difference between color information of each feature point, and a luminance vector of each feature point in association.

For example, Japanese Laid-open Patent Publication Nos. 2011-134117, 2015-149008 and M. Calonder, V. Lepetit, C. Strecha, and P. Fua., "BRIEF: Binary Robust Independent Elementary Features", In Proceedings of the European Conference on Computer Vision (ECCV), 2010 disclose related arts.

SUMMARY

According to an aspect of the invention, an image similarity determination apparatus includes a memory and a processor configured to acquire a first image and a second image, perform selection of a first group and a second group from a plurality of feature points included in the first image and perform selection of a third group and a fourth group from a plurality of feature points included in the second image, calculate feature quantity for each feature point included in the first group and the third group on the basis of luminance and calculate feature quantity for each feature point included in the second group and the fourth group on the basis of hue, and determine similarity between the first image and the second image on the basis of both first comparison of the first group with the third group and second comparison of the second group with the fourth group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a view illustrating an example of configuration of a pixel pair management table;

FIG. 8 is a view illustrating an example of configuration of an intermediate data management table;

FIG. 10 is a view illustrating examples of configuration of a luminance feature quantity management table and a hue feature quantity management table;

DESCRIPTION OF EMBODIMENTS

According to the method of calculating each bit value of a binary code indicating the local feature quantity, based on a sign of a luminance difference between pixels included in a pixel pair as in the conventional art, disadvantageously, the feature quantity becomes unstable in a region having a small luminance difference between pixels, lowering the accuracy of determining the similarity between images. That is, in the region having the small luminance difference between pixels, since the luminance difference between pixels included in the pixel pair is close to 0, the sign of the bit value is readily inverted due to the state of the light source or noise at shooting. For this reason, when a correspondence point of a second image with respect to the feature point in a first image is searched using the local feature quantity calculated from such region, the search often ends in failure. Such search failure contributes to the accuracy of determining the similarity between images.

Embodiments of the present disclosure will be described below with reference to figures.

First Embodiment

Figure 1:
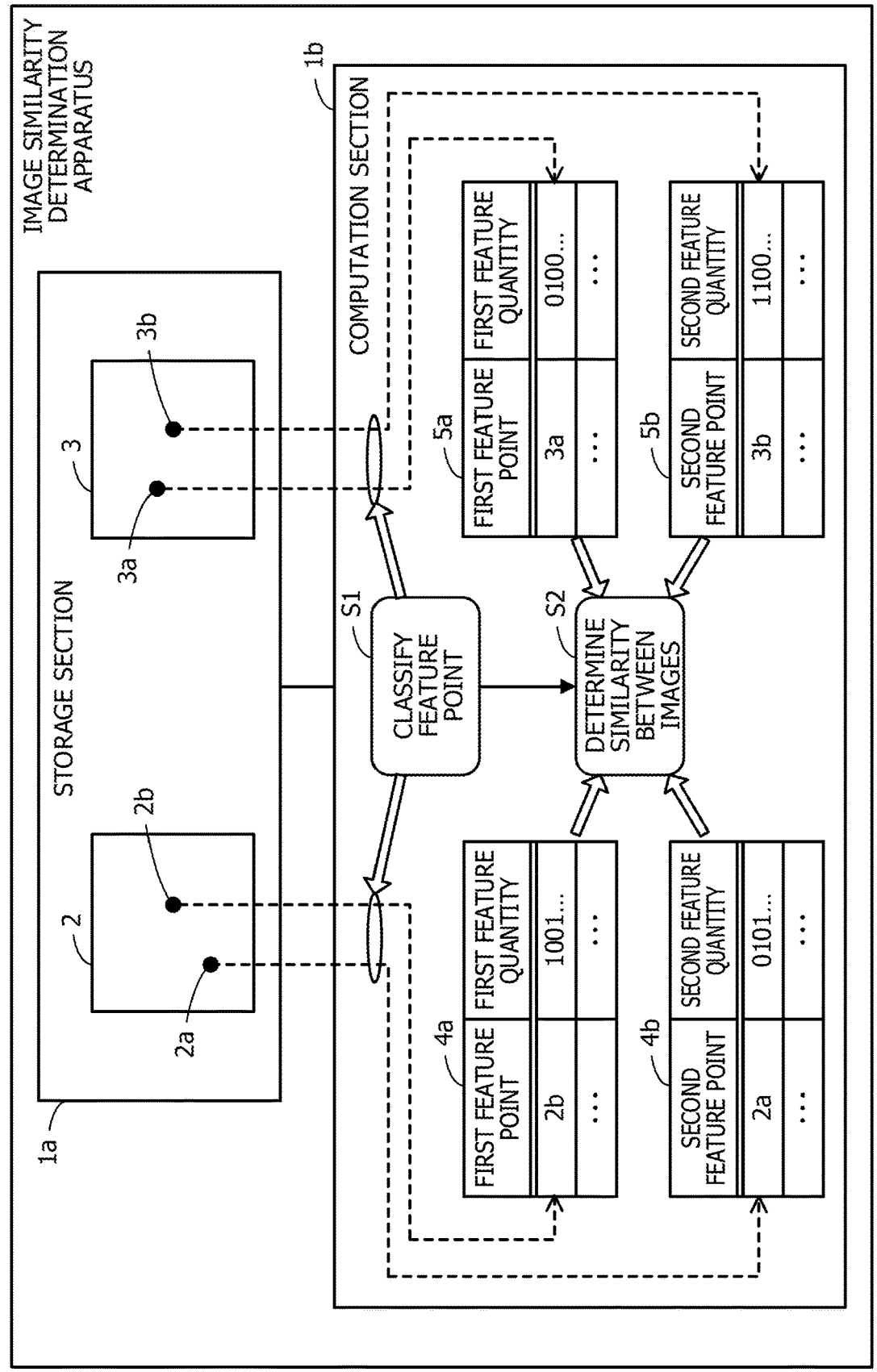
FIG. 1 is a view illustrating an example of configuration and processing of an image similarity determination apparatus in accordance with a first embodiment.

FIG. 1 is a view illustrating an example of configuration and processing of an image similarity determination apparatus in accordance with a first embodiment. The image similarity determination apparatus 1 illustrated in FIG. 1 includes a storage section 1a and a computation section 1b. For example, the storage section 1a is embodied as a storage device such as a random access memory (RAM) and a hard disk drive (HDD). For example, the computation section 1b is embodied as a processor.

The storage section 1a stores images 2 and 3 to be determined in terms of similarity. The images 2 and 3 each have a plurality of feature points.

The computation section 1b classifies each feature point included in the image 2 as a first feature point or a second feature point. Similarly, the computation section 1b classifies each feature point included in the image 3 as a first feature point or a second feature point (Step S1). The first feature point is a feature point at which a first feature quantity is calculated based on luminance. The second feature point is a feature point at which a second feature quantity is calculated based on hue.

For example, the computation section 1b classifies, among the feature points included in the images 2 and 3, the feature points having a high stability in the first feature quantity as the first feature points, and feature points having a high stability in the second feature quantity as the second feature points. "High stability in the feature quantity" represent that the value of the calculated feature quantity tends to become fixed (that is, the value is hard to vary) even when shooting conditions such as illumination change or noise occurs.

In FIG. 1, it is assumed that classification results of the feature points are managed by using management tables 4a, 4b, 5a, and 5b. Specifically, an identification number of the feature point (for example, feature point 2b) classified as the first feature point among the feature points included in the image 2 is registered in the management table 4a. An identification number of the feature point (for example, feature point 2a) classified as the second feature point among the feature points included in the image 2 is registered in the management table 4b. An identification number of the feature point (for example, feature point 3a) classified as the first feature point among the feature points included in the image 3 is registered in the management table 5a. An identification number of the feature point (for example, feature point 3b) classified as the second feature point among the feature points included in the image 3 is registered in the management table 5b.

Further, in the example illustrated in FIG. 1, the first feature quantity calculated with respect to the first feature point is also registered in the management tables 4a and 5a, and the second feature quantity calculated with respect to the second feature point is also registered in the management tables 4b and 5b.

Next, the computation section 1b determines the similarity between the image 2 and the image 3 using the first feature quantities calculated with respect to the first feature points included in the images 2 and 3, and the second feature quantities calculated with respect to the second feature points included in the images 2 and 3 (Step S2). In the example illustrated in FIG. 1, the similarity is determined using the first feature quantities registered in the management tables 4a and 5a, and the second feature quantities registered in the management tables 4b and 5b.

In the above-mentioned similarity determination processing between the images 2 and 3 by the computation section 1b, the first feature quantity based on luminance and the second feature quantity based on hue may be selectively used for each feature point in the images 2 and 3. Thus, in comparison with the case of using either the first feature quantity or the second feature quantity, the image similarity determination accuracy may be improved.

For example, in some region, even in the case where the similarity determination accuracy is lowered by using the first feature quantity based on luminance, the similarity determination accuracy may be improved using the second feature quantity based on hue. In the processing executed by the computation section 1b, the similarity determination accuracy may be improved by classifying the feature point included in such region as the second feature point.

In a specific example of calculating the feature quantity corresponding to the feature point, a plurality of pixel pairs surrounding the feature point are set, the first feature quantity is calculated based on a difference in luminance between pixels in each pixel pair, and the second feature quantity is calculated based on a difference in hue between pixels in each pixel pair. In this case, in the region having a small difference in luminance between the pixels, due to changes in shooting conditions such as illumination or the occurrence of noise, the first feature quantity calculated based on the difference in luminance may readily vary. However, even in the case of such small difference in luminance between the pixels, when the difference in hue between the pixels is large, the second feature quantity calculated based on the difference in hue does not readily vary in response to changes in shooting conditions or the occurrence of noise. For this reason, the similarity determination accuracy may be improved by classifying the feature point included in such region as the second feature point, and using the second feature quantity in similarity determination.

As another example, both of the first feature quantity and the second feature quantity are calculated as feature quantities corresponding to the feature points, and the two feature quantities are used to perform image similarity determination. However, according to this method, the computational complexity of the feature quantities increases, adding processing loads for similarity determination to increase processing time. On the contrary, according to the above-mentioned processing executed by the computation section 1b, since each feature point in the images 2 and 3 is previously classified as either the first feature point or the second feature point, it is unnecessary for calculating both the first feature point and the second feature point for each feature point. For this reason, the former method may decrease the computational complexity of the feature quantities to shorten time for the calculation.

Second Embodiment

Next, an image processing apparatus that selects a key image is selected from a plurality of stored images, and searches for an image that resembles the key image through images other than the key image in accordance with a second embodiment will be described. In the second embodiment, the feature quantity based on BRIEF is used as the image feature quantity. However, other types of binary feature quantities acquired by binarizing a difference between pixel values of a pixel pair set near the feature point, for example, oriented fast and rotated brief (ORB) and binary robust invariant scalable keypoints (BRISK), may be used.

Figure 2:
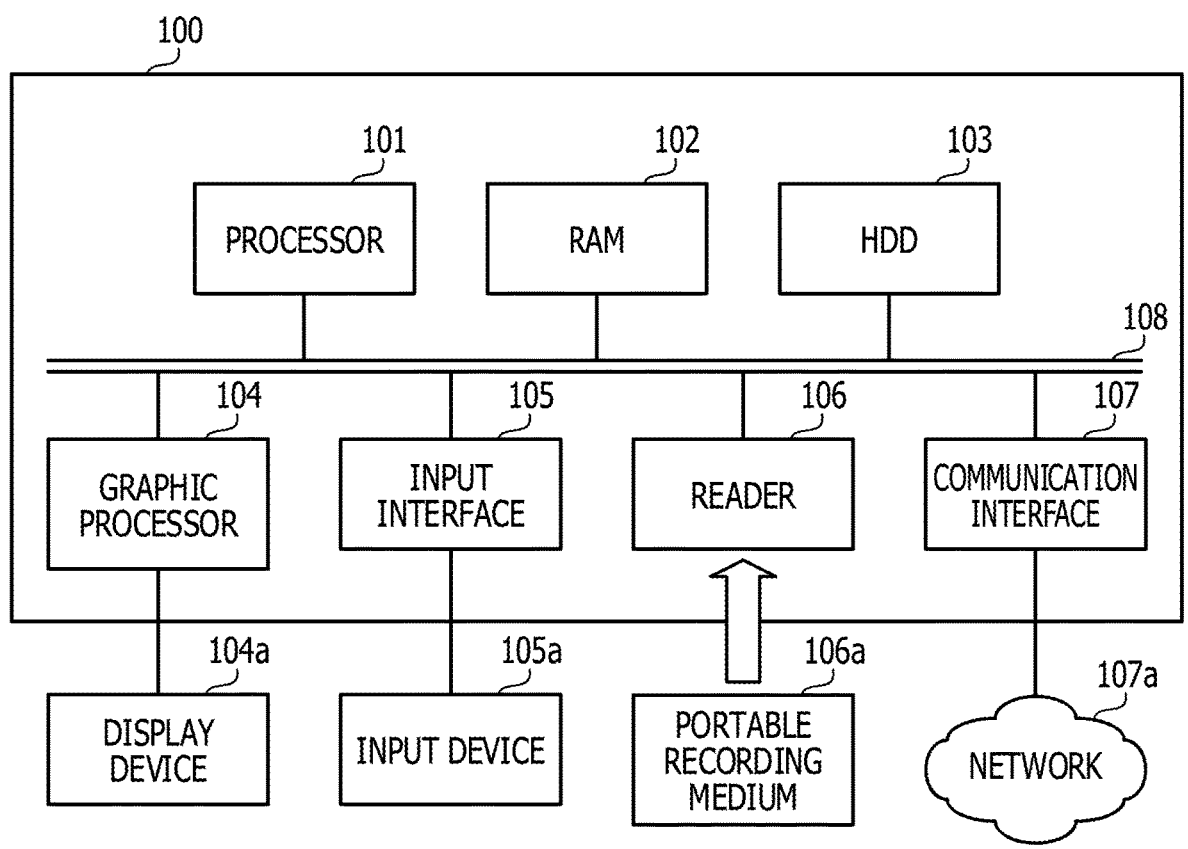
FIG. 2 is a view illustrating an example of hardware configuration of an image processing apparatus in accordance with a second embodiment.

FIG. 2 is a view illustrating an example of hardware configuration of the image processing apparatus in accordance with the second embodiment. For example, the image processing apparatus 100 in accordance with the second embodiment is embodied as a computer as illustrated in FIG. 2.

The image processing apparatus 100 is controlled by a processor 101 as a whole. Examples of the processor 101 include a central processing unit (CPU), a micro processing unit (MPU), a digital signal processor (DSP), an application specific integrated circuit (ASIC), and a programmable logic device (PLD). The processor 101 may be a combination of two or more of the CPU, MPU, DSP, ASIC, and PLD.

A RAM 102 and a plurality of peripheral devices are connected to the processor 101 via a bus 108.

The RAM 102 is used as a main memory of the image processing apparatus 100. The RAM 102 temporarily stores at least a portion of an operating system (OS) program and application program, which are executed by the processor 101. The RAM 102 stores various types of data requested for processing of the processor 101.

Peripheral devices connected to the bus 108 are an HDD 103, a graphic processor 104, an input interface 105, a reader 106, and a communication interface 107.

The HDD 103 is used as an auxiliary memory of the image processing apparatus 100. The HDD 103 stores an OS program, an application program, and various types of data. Any other type of nonvolatile memory such as a solid state drive (SSD) may be used as the auxiliary memory.

A display device 104a is connected to the graphic processor 104. In response to an instruction from the processor 101, the graphic processor 104 allows the display device 104a to display images. Examples of the display device include a liquid crystal display and an organic electroluminescence (EL) display.

An input device 105a is connected to the input interface 105. The input interface 105 transmits a signal outputted from the input device 105a to the processor 101. Examples of the input device 105a include a keyboard and a pointing device. Examples of the pointing device include a mouse, a touch panel, a tablet, a touch pad, and a track ball.

A portable recording medium 106a is removed from/attached to the reader 106. The reader 106 reads data recorded in the portable recording medium 106a, and transmits the data to the processor 101. Examples of the portable recording medium 106a include an optical disc, a magneto-optical disc, and a semiconductor memory.

The communication interface 107 transmits/receives data to/from other devices via a network 107a.

The above-mentioned hardware configuration may realize processing functions of the image processing apparatus 100.

The memory (for example, the HDD 103) of the image processing apparatus 100 stores data of a plurality of images. The images may be stored in the memory of the image processing apparatus 100 using the portable recording medium 106a, or may be stored in the memory of the image processing apparatus 100 via the network 107a.

The images stored in the memory are images taken by use of an imaging device. In this case, in the image processing apparatus 100, for example, a picture management software executes following processing.

Using an input operation, the user selects the key image from a plurality of taken images in the memory. Then, the image processing apparatus 100 extracts a taken image that resembles the key image from images other than the key image in the plurality of taken images in the memory (hereinafter referred to as "reference image"). For example, the reference image assumed to include the same object as an object in the key image is extracted as the taken image that resembles the key image. Thereby, for example, the user may search for an image requested as a material in the image processing apparatus 100, or may automatically collect pictures at the same events and organizes the pictures. This may offer convenience and pleasure to the user.

The image search function of the image processing apparatus 100 may be used to manage taken images as described above as well as documents such as presentation materials. For example, a plurality of documents is stored in the memory of the image processing apparatus 100, and a key document is selected from the documents. For example, the image processing apparatus 100 may extract a document that resembles the key document in appearance on the display from other documents, or may extract a document having the same image, table, graph, or so on as the key document from other documents. This may reduce work time for searching documents. In addition, reuse of past document resources may be promoted to enhance efficiency of operations.

The image search function of the image processing apparatus 100 may be used as an added function of a medical image management system. For example, an affected region on computed tomography (CT) images or magnetic resonance imaging (MRI) images that are taken at a plurality of timings may be automatically positioned to determine a change in the affected region with time.

The image processing apparatus 100 is embodied as a terminal device operated by the user, for example, a personal computer and a smart phone. The image processing apparatus 100 may be also embodied as a server on the network. In this case, data of images stored in the memory of the image processing apparatus 100 is uploaded from the terminal device of the user to the image processing apparatus 100 via the network.

Figure 3:
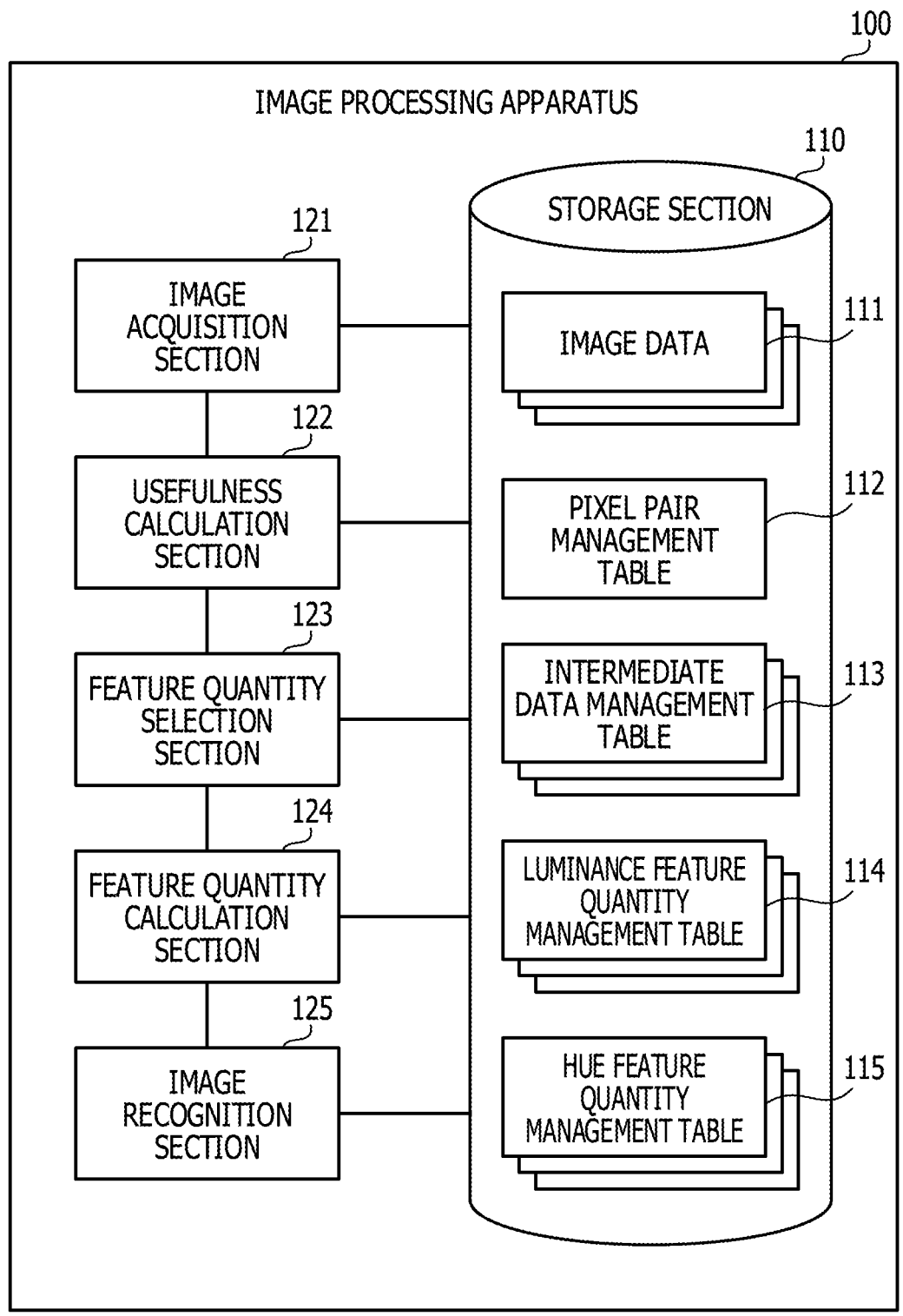
FIG. 3 is a block diagonal illustrating an example of configuration of processing functions of the image processing apparatus.

FIG. 3 is a block diagram illustrating an example of configuration of processing functions of the image processing apparatus. The image processing apparatus 100 includes a storage section 110, an image acquisition section 121, a usefulness calculation section 122, a feature quantity selection section 123, a feature quantity calculation section 124, and an image recognition section 125.

The storage section 110 is implemented as a storage region of the memory (for example, the RAM 102 or the HDD 103) of the image processing apparatus 100. The storage section 110 stores image data 111, a pixel pair management table 112, an intermediate data management table 113, a luminance feature quantity management table 114, and hue feature quantity management table 115.

A plurality of pieces of image data 111 is stored in the storage section 110. The pieces of image data 111 each represent data of an image used for similarity search (hereinafter referred to as "stored image"). In similarity search, one key image is selected from the stored images, and an image that resembles the key image is searched through remaining stored images (reference images).

Coordinates of the pixel pair used to calculate the feature quantity of each stored image is registered in the pixel pair management table 112.

The intermediate data management table 113 is prepared for each stored image. Intermediate data used in the process of calculating the feature quantity of the corresponding stored image is temporarily registered in the intermediate data management table 113. Below-mentioned luminance absolute vector, hue absolute vector, luminance norm, and hue norm are registered as the intermediate data.

The luminance feature quantity management table 114 and the hue feature quantity management table 115 are prepared for each stored image. The luminance feature quantity management table 114 and the hue feature quantity management table 115, which correspond to one stored image, hold the feature quantity (local feature quantity) at each feature point in the stored image. As described later, in this embodiment, the feature points in the stored image are classified into a luminance feature point at which a luminance feature quantity based on luminance is calculated, and a hue feature point at which a hue feature quantity based on hue is calculated. The luminance feature quantity at the luminance feature point is registered in the luminance feature quantity management table 114, and hue feature quantity at the hue feature point is registered in the hue feature quantity management table 115.

Processing of the image acquisition section 121, the usefulness calculation section 122, the feature quantity selection section 123, the feature quantity calculation section 124, and the image recognition section 125 are implemented by allowing the processor 101 to perform a predetermined application program.

The image acquisition section 121 acquires the image data 111, and stores the image data 111 in the storage section 110. For example, the image acquisition section 121 acquires the image data 111 of a taken image via the portable recording medium 106*a* or the network 107*a*.

The usefulness calculation section 122 calculates a degree of usefulness indicating which of the luminance feature quantity and the hue feature quantity is more useful as the local feature quantity at each feature point in the stored image. Based on the degree of usefulness, the feature quantity selection section 123 selects either the luminance feature quantity or the hue feature quantity as the local feature quantity at each feature point. In other words, based on the calculated degree of usefulness, the feature quantity selection section 123 classifies each feature point as the luminance feature point or the hue feature point.

The feature quantity calculation section 124 calculates the luminance feature quantity or the hue feature quantity at each feature point. The feature quantity calculation section 124 registers the calculated luminance feature quantity in the luminance feature quantity management table 114, and registers the calculated hue feature quantity in the hue feature quantity management table 115. In this manner, the feature quantity calculation section 124 calculates the feature quantity in each stored image, and registers the feature quantity in the storage section 110.

The image recognition section 125 accepts an operation of selecting the key image, and while referring to the luminance feature quantity management table 114 and the hue feature quantity management table 115, searches for an image that resembles the key image through the stored images other than the selected key image.

<Feature Quantity Calculation Processing>

Next, feature quantity calculation processing executed by the image processing apparatus 100 will be described.

First, a method of setting the pixel pair in the feature region will be described. In this embodiment, the pixel pair is set as follows in the similar way to using BRIEF as the feature quantity.

A plurality of feature points are set in the stored image, and the local feature quantity is calculated at each feature point. The feature points are commonly set to a plurality of stored images. In this embodiment, it is assumed to use DenseSampling of setting feature points in the stored image at regular intervals (for example, at intervals of 24 pixels).

A certain region around each feature point is set as the feature region. For example, the feature region is a rectangular region of 48 pixels around the feature point. Further, a plurality of pixel pairs is previously set in the feature region. The local feature quantity of one feature point is calculated as a bit string configured by combining signs based on a difference between pixel values of each pixel pair in the corresponding feature region. According to BRIEF, each bit value in the bit string is determined based on the luminance difference. However, in this embodiment, depending on the feature point, each bit value is determined based on the luminance difference or the hue difference.

FIG. 4 is a view illustrating an example of configuration of the pixel pair management table. Coordinates of each pixel included in the pixel pair are previously registered in the pixel pair management table 112. As illustrated in FIG. 4, an ID for identifying the pixel pair, and coordinates of a first pixel and a second pixel of the pixel pair are registered in the pixel pair management table 112. For example, the pixel pair is randomly set. Information on the pixel pair registered in the pixel pair management table 112 is commonly applied to all feature regions.

Next, local feature quantity calculation processing using the pixel pair management table 112 will be described. After describing a comparison example of local feature quantity calculation processing with reference to FIGS. 5 to 6B, the local feature quantity calculation processing in this embodiment is described with reference to FIGS. 7 to 11.

Figure 5:
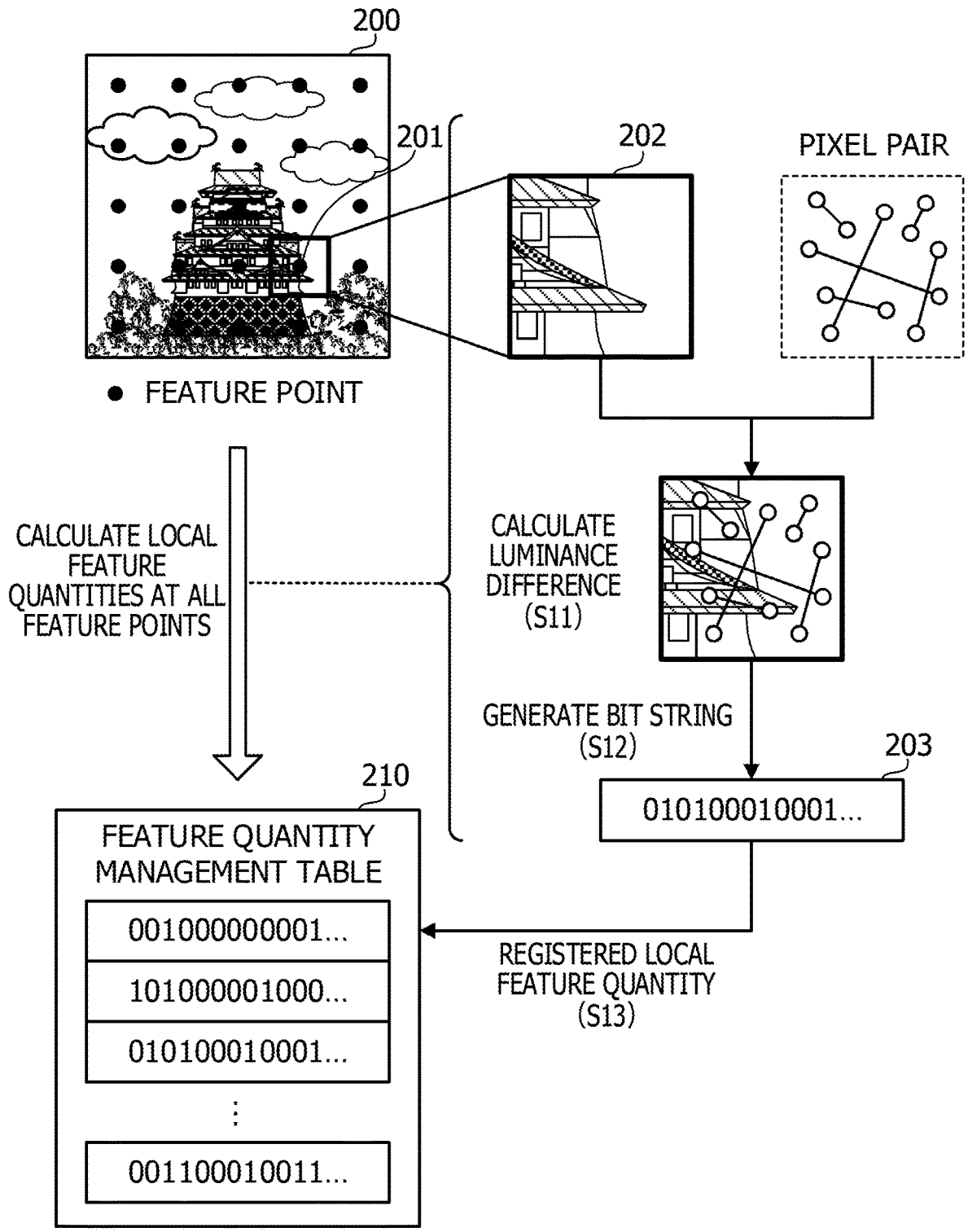
FIG. 5 is a view for describing a comparison example of local feature quantity calculation processing.

FIG. 5 is a view for describing the comparison example of the local feature quantity calculation processing. FIG. 5 illustrates an example of processing of using BRIEF as the local feature quantity and registering the local feature quantity at each feature point in an image 200 in a feature quantity management table 210 corresponding to the image 200.

For example, the local feature quantity of a feature point 201 set in the image 200 is calculated as follows. First, the luminance difference in each pixel pair in a feature region 202 corresponding to the feature point 201 is calculated (Step S11). The luminance difference in the pixel pair is acquired, for example, by subtracting a luminance value of the second pixel from a luminance value of the first pixel in the pixel pair management table 112.

Next, a bit string 203 is generated by combining bit values corresponding to the code of the sign of the calculated luminance difference (Step S12). Specifically, when the luminance difference is a positive value, the bit value is set to 1, and when the luminance difference is equal to or smaller than 0, the bit value is set to 0. The bit value is determined in the order of the pixel pair, and added to the bit string 203. For example, when M pixel pairs are set, the bit string 203 of M bits is generated. Next, the generated bit string 203 is registered as the local feature quantity at the feature point 201, in the feature quantity management table 210 (Step S13).

In this manner, local feature quantities (bit strings) corresponding to all feature points set in the image 200 are calculated, and recorded as feature quantities corresponding to the image 200 in the feature quantity management table 210.

However, as described above, when each bit value of the local feature quantity is determined based on the sign of the luminance difference, in a region having a small luminance difference between pixels, the luminance difference between pixels becomes closer to 0. For this reason, due to a minute change in shooting conditions of a light source or the like, and the occurrence of noise, the bit value tends to vary, making the value of the local feature quantity unstable. This disadvantageously lowers the image recognition accuracy.

On the contrary, in some region of an image, the luminance difference between pixels may be small, while the hue difference between pixels may be large. For example, manual designs such as mark and sign often use colors belonging to the same tone. Since the same tone includes colors having a large hue difference, in the region containing a manual design, often, the luminance difference between pixels is small, while the hue difference between pixels is large.

Figure 6A:
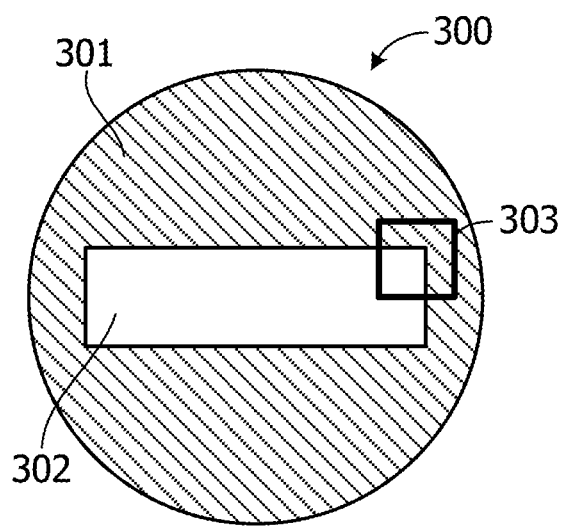
FIGS. 6A and 6B are views illustrating examples of marks.
Figure 6B:
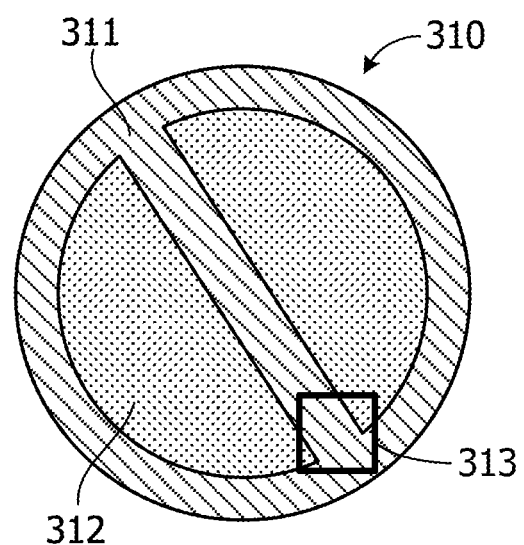

FIGS. 6A and 6B are views illustrating an example of marks. A mark 300 illustrated in FIG. 6A includes regions 301 and 302 of respective colors having a large luminance difference therebetween. For example, when a feature region 303 including a boundary between the regions 301 and 302 is set, in the feature region 303, the luminance difference between pixels included in the pixel pair readily becomes large. For this reason, it is likely that the local feature quantity may be stably calculated when using the luminance difference. That is, even when illumination varies or noise occurs, there is a high possibility that the local feature quantity having the same value is calculated.

A mark 310 illustrated in FIG. 6B includes regions 311 and 312 of respective colors having a large hue difference and a small luminance difference therebetween. For example, when a feature region 313 including the regions 311 and 312 is set, in the feature region 313, the luminance difference between pixels included in the pixel pair becomes small, such that the local feature quantity calculated using the luminance difference tends to become unstable. That is, when illumination varies or noise occurs, it is likely that the value of the calculated local feature quantity varies.

In the region such as the feature region 313 where the luminance difference between pixels is small but the hue difference is large, for example, the feature quantity may be stably acquired against a change in illumination and noise by calculating the local feature quantity based on the hue difference. Thus, in this embodiment, the accuracy of image similarity determination is improved by using the local feature quantity based on the luminance difference as well as the local feature quantity based on the hue difference.

Hereinafter, the local feature quantity based on the luminance difference will be described as "luminance feature quantity", and the local feature quantity based on the hue difference will be described as "hue feature quantity". The luminance feature quantity is the local feature quantity as the bit value determined based on the sign of the luminance difference between pixels in the pixel pair, that is, BRIEF. The hue feature quantity is the local feature quantity as the bit value determined based on the sign of the hue difference between pixels in the pixel pair.

Here, as an example of using both of the luminance feature quantity and the hue feature quantity, both of the luminance feature quantity and the hue feature quantity at each feature point are calculated, and the calculated local feature quantities are used to determine image similarity. However, according to this method, computational complexity of the local feature quantity increases, adding processing loads for similarity determination to increase processing time.

Figure 7:
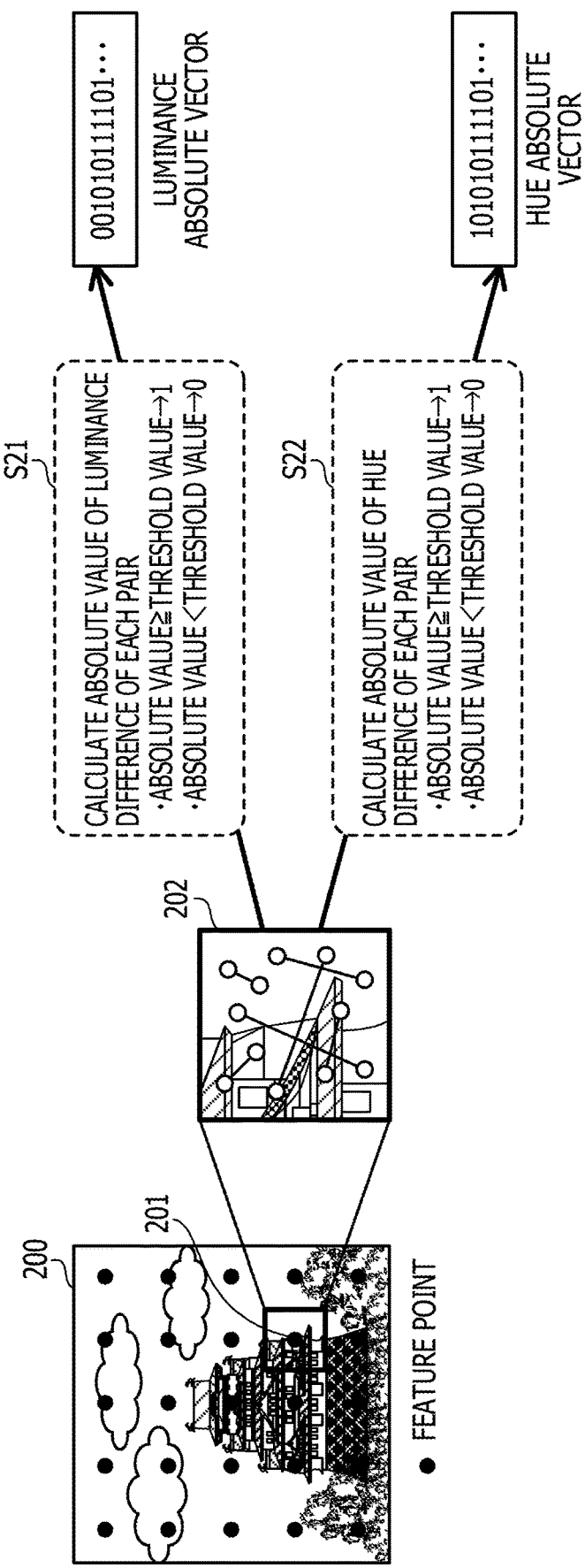
FIG. 7 is a view for describing absolute vector calculation processing.

Thus, the image processing apparatus 100 in this embodiment calculates "the degree of usefulness" indicating which of the luminance feature quantity and the hue feature quantity at each feature point is more useful. Then, the image processing apparatus 100 selectively calculates the luminance feature quantity and the hue feature quantity at each feature point, based on the degree of usefulness, uses the calculated local feature quantities to perform the image recognition processing. With reference to FIGS. 7 and 8, usefulness calculation processing executed by the usefulness calculation section 122 will be described below.

FIG. 7 is a view for describing absolute vector calculation processing. The usefulness calculation section 122 calculates the luminance absolute vector and the hue absolute vector at each feature point in the stored image, as intermediate data for calculating the degree of usefulness. The luminance absolute vector and the hue absolute vector each are a bit string acquired by combining bit values corresponding to pixel pairs in the feature region. Accordingly, the luminance absolute vector and the hue absolute vector have the same number of digits as the local feature quantity.

For example, the usefulness calculation section 122 identifies the feature region 202 corresponding to the feature point 201 set in the image 200. Using luminance data in the feature region 202, the usefulness calculation section 122 calculates an absolute value of the luminance difference between pixels in the pixel pair for each pixel pair. Then, the usefulness calculation section 122 compares the absolute value of the calculated luminance difference with a predetermined threshold value more than 0, sets the corresponding bit value to 1 when the absolute value of the luminance difference is equal to or greater than the threshold value, and sets the corresponding bit value to 0 when the absolute value of the luminance difference is smaller than the threshold value (Step S21). The luminance absolute vector is calculated by determining the bit value of each pixel pair according to the above-mentioned procedure.

Using hue data of the feature region 202, the usefulness calculation section 122 calculates an absolute value of the hue difference between pixels in each pixel pair. Then, the usefulness calculation section 122 compares the calculated absolute value of the hue difference with the threshold value, sets the corresponding bit value to 1 when the absolute value of the hue difference is equal to or greater than the threshold value, and sets the corresponding bit value to 0 when the absolute value of the hue difference is smaller than the threshold value (Step S22). The hue absolute vector is calculated by determining the bit value of each pixel pair according to the above-mentioned procedure.

That the bit value of the luminance absolute vector is 1 represents that the luminance difference of the pixel pair corresponding to the bit value is large. Accordingly, as the number of bit values of "1" included in the luminance absolute vector is larger, the stability of the luminance feature quantity at the corresponding feature point is higher (that is, the degree of usefulness of the luminance feature quantity is higher). That the bit value of the hue absolute vector is 1 represents that the hue difference of the pixel pair corresponding to the bit value is large. Accordingly, as the number of bit values of "1" included in the hue absolute vector is larger, the stability of the hue feature quantity at the corresponding feature point is higher (that is, the degree of usefulness of the hue feature quantity is higher).

FIG. 8 is a view illustrating an example of configuration of the intermediate data management table. In calculating the degree of usefulness of a certain stored image, the usefulness calculation section 122 creates the intermediate data management table 113 corresponding to the stored image, and stores the table in the storage section 110. The ID for identifying the feature point, coordinates of the feature point, the luminance absolute vector, the luminance norm, the hue absolute vector, and the hue norm are registered in the intermediate data management table 113.

A record corresponding to each feature point set in the stored image is previously created in the intermediate data management table 113. The usefulness calculation section 122 registers the luminance absolute vector and the hue absolute vector, which are calculated at each feature point, in the corresponding record. The luminance norm represents a norm of the luminance absolute vector, and the hue norm represents a norm of the hue absolute vector. The "norm" is the number of "1" included in the bit string. Accordingly, the luminance norm represents the degree of usefulness of the luminance feature quantity, and the hue norm represents the degree of usefulness of the hue feature quantity. That is, as the luminance norm is larger, the stability of the luminance feature quantity is higher, and as the hue norm is larger, the stability of the hue feature quantity is higher.

Figure 9:
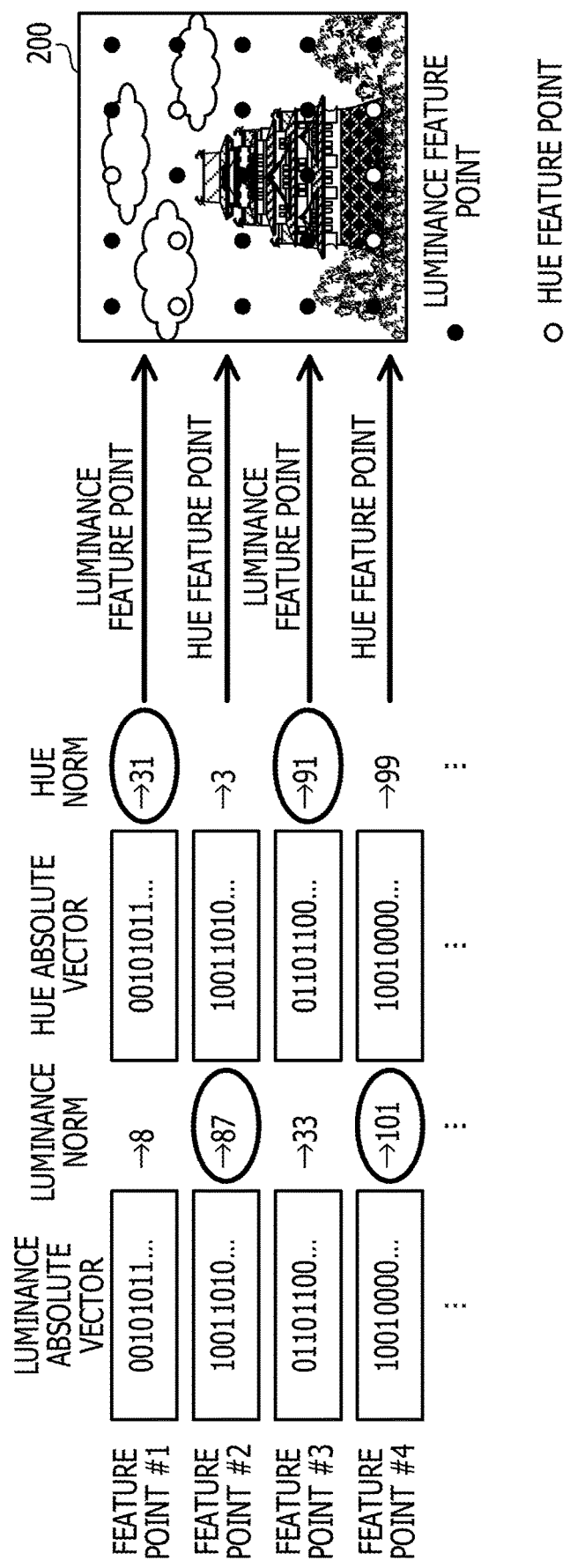
FIG. 9 is a view for describing local feature quantity selection processing.

For each feature point, the usefulness calculation section 122 calculates the luminance norm based on the luminance absolute vector, calculates the hue norm based on the hue absolute vector, and registers the norms in the record corresponding to the feature point. As illustrated in FIG. 9, the luminance norm and the hue norm are used to determine which of the luminance feature quantity and the hue feature quantity is selected as the local feature quantity corresponding to the feature point.

FIG. 9 is a view for describing local feature quantity selection processing. The feature quantity selection section 123 compares the luminance norm and the hue norm, which are calculated for each feature quantity, with each other, selects the luminance feature quantity as the local feature quantity when the luminance norm is larger than the hue norm, and sets the hue feature quantity as the local feature quantity when the luminance norm is equal to or smaller than the hue norm.

Hereinafter, the feature point at which the luminance feature quantity is selected will be described as "luminance feature point", and the feature point at which the hue feature quantity is selected will be described as "hue feature point". According to the processing of the feature quantity selection section 123, each feature point in the stored image is classified as the luminance feature point or the hue feature point. In the example illustrated in FIG. 9, a feature point #1 in the image 200 is classified as the hue feature point since the hue norm is larger than the luminance norm. A feature point #2 is classified as the luminance feature point since as the luminance norm is larger than the hue norm. A feature point #3 is classified as the hue feature point since the hue norm is larger than the luminance norm. A feature point #4 is classified as the luminance feature point since as since the luminance norm is larger than the hue norm.

FIG. 10 is a view illustrating an example of configuration of the luminance feature quantity management table and the hue feature quantity management table. In executing the local feature quantity selection processing, for each feature point in a certain stored image, the feature quantity selection section 123 creates the luminance feature quantity management table 114 and the hue feature quantity management table 115 that correspond to the stored image, and stores the tables in the storage section 110. The ID for identifying the luminance feature point, coordinates of the luminance feature point, and the luminance feature quantity are registered in the luminance feature quantity management table 114. The ID for identifying the hue feature point, coordinates of the hue feature point, and the hue feature quantity are registered in the hue feature quantity management table 115.

When the feature point is classified as the luminance feature point, the feature quantity selection section 123 adds a record to the luminance feature quantity management table 114, and registers the ID and the coordinates of the luminance feature point in the record. After that, when the feature quantity calculation section 124 calculates the luminance feature quantity corresponding to the luminance feature point, the luminance feature quantity is registered in the record.

When the feature point is classified as the hue feature point, the feature quantity selection section 123 adds a record to the hue feature quantity management table 115, and registers the ID and the coordinates of the hue feature point. After that, when the feature quantity calculation section 124 calculates the hue feature quantity corresponding to the hue feature point, the hue feature quantity is registered in the record.

Figure 11:
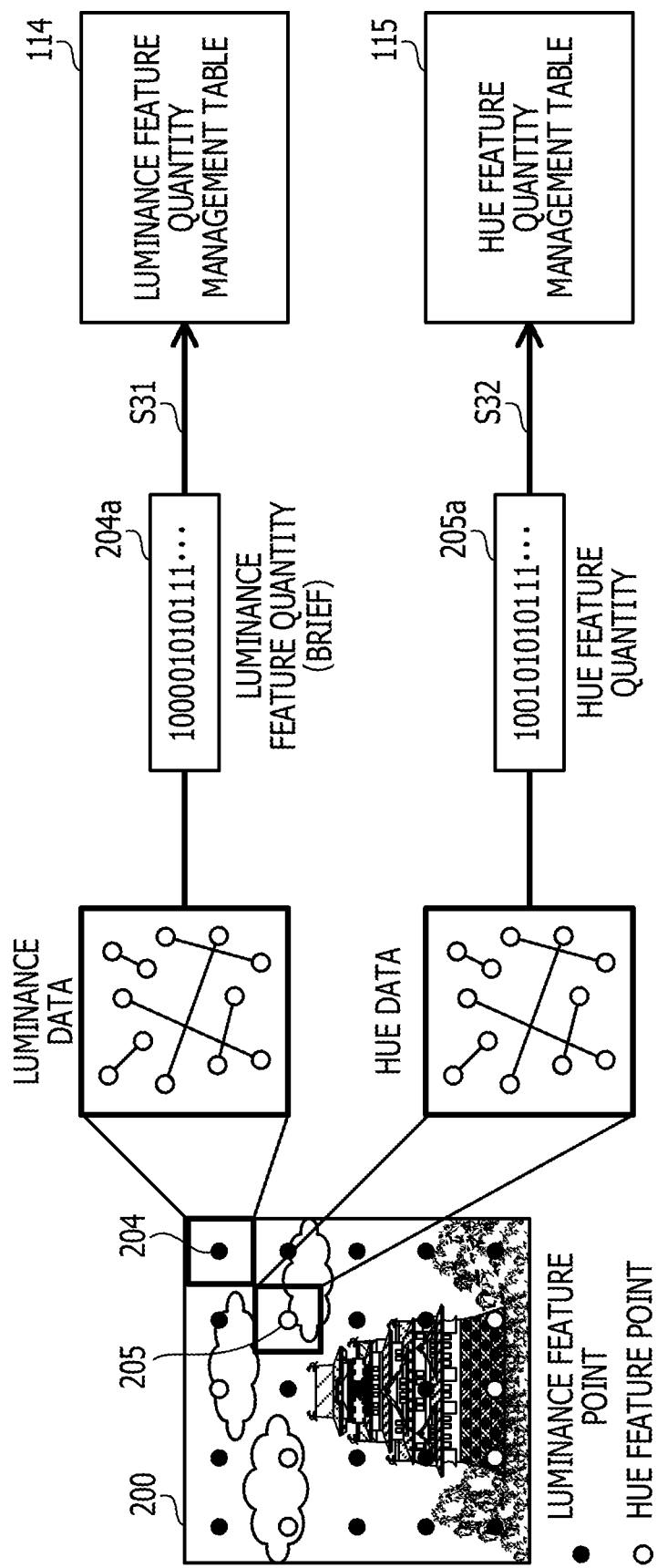
FIG. 11 is a view for describing local feature quantity calculation processing.

FIG. 11 is a view for describing local feature quantity calculation processing. For example, when a feature point 204 set in the image 200 is classified as the luminance feature point, the feature quantity calculation section 124 calculates a luminance feature quantity (BRIEF) 204a, based on luminance data of the feature region corresponding to the feature point 204. The feature quantity calculation section 124 records the calculated luminance feature quantity 204a in the record corresponding to the feature point 204 in the luminance feature quantity management table 114 (Step S31).

For example, when a feature point 205 set in the image 200 is classified as the hue feature point, the feature quantity calculation section 124 calculates a hue feature quantity 205a, based on hue data of the feature region corresponding to a feature point 205. The feature quantity calculation section 124 registers the calculated hue feature quantity 205a in the record corresponding to the feature point 205 in the hue feature quantity management table 115 (Step S32).

Through the above-mentioned procedure, the feature quantity of each stored image is calculated, and registered in the storage section 110.

<Image Recognition Processing>

Next, image recognition processing executed by the image recognition section 125 will be described with reference to FIGS. 12 to 14.

Figure 12:
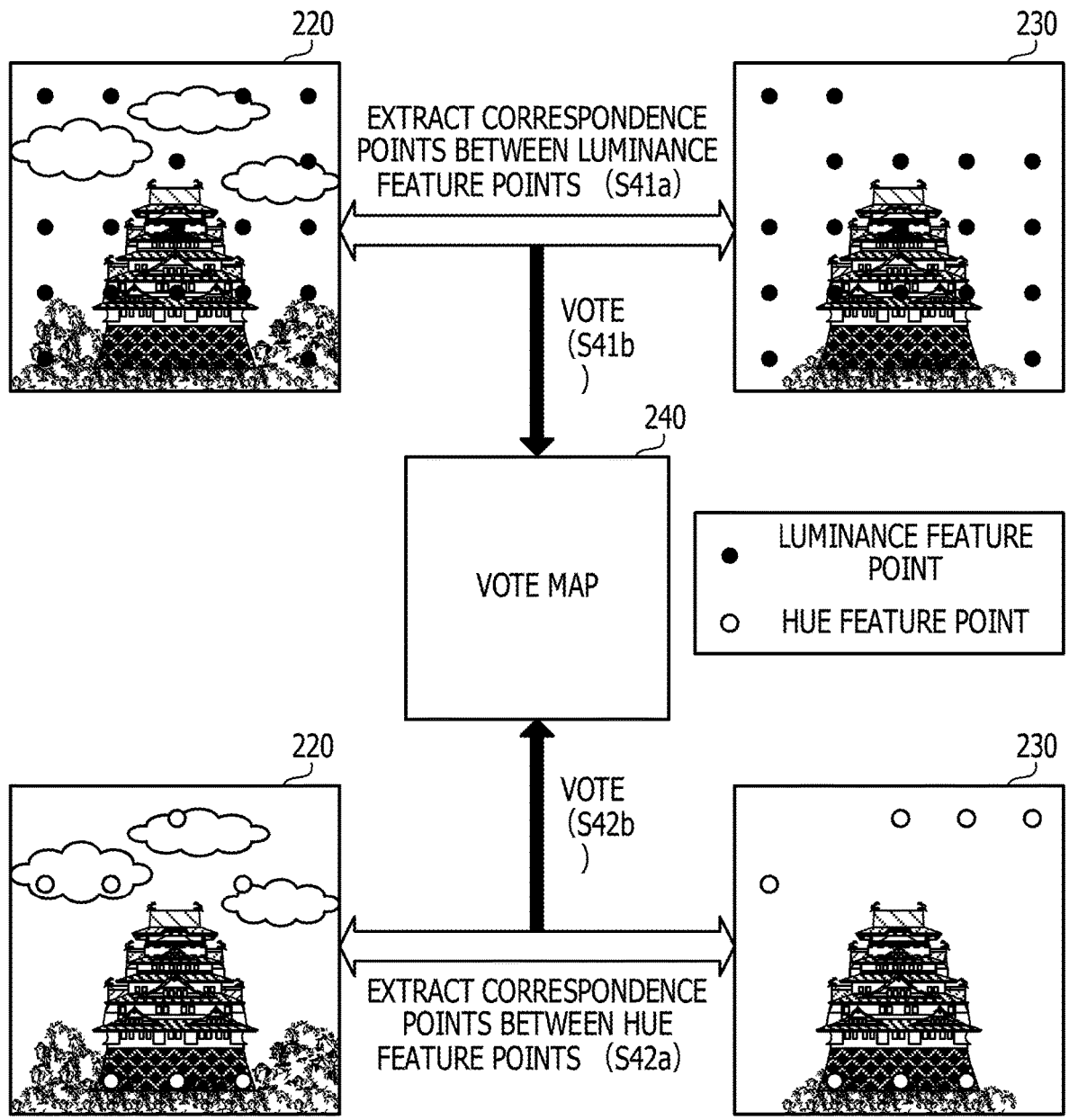
FIG. 12 is a view for describing correspondence point extraction processing.

FIG. 12 is a view for describing correspondence point extraction processing. In response to an input of the user, the image recognition section 125 selects a key image from stored images. Then, the image recognition section 125 compares the selected key image with other taken images (reference images), and searches for an images that resembles the key image through the reference images.

By comparison of the key image with the reference images, similar feature points between the images are searched. According to this processing, the image recognition section 125 calculates Hamming distance between the local feature quantity at the feature point from the key image and the local feature quantity at each feature point in the reference image, and extracts the feature point having the smallest Hamming distance from the feature points in the reference image, as the correspondence point having the highest similarity.

FIG. 12 illustrates the processing of extracting the correspondence points corresponding to the feature points in a key image 220 from a reference image 230. In this embodiment, as described above, the feature points in the key image 220 and the feature points in the reference image 230 are classified as the luminance feature points or the hue feature points.

Thus, the image recognition section 125 extracts correspondence points corresponding to the luminance feature points among the feature points in the key image 220, from the luminance feature points among the feature points in the reference image 230 (Step S41a). In extracting the correspondence points, the luminance feature quantity calculated on the luminance feature point in the key image 220 is compared with the luminance feature quantity calculated on the luminance feature point in the reference image 230. The image recognition section 125 extracts correspondence points corresponding to the hue feature points among the feature points in the key image 220, from the hue feature points among the feature points in the reference image 230 (Step S42a). In extracting the correspondence points, the hue feature quantity calculated on the hue feature point in the key image 220 is compared with the hue feature quantity calculated on the hue feature point in the reference image 230.

Next, the image recognition section 125 executes following processing for each luminance feature point in the key image 220. The image recognition section 125 estimates the central position of the key image 220 in the reference image 230, when the reference image 230 and the key image 220 overlap each other such that the luminance feature points in the key image 220 match the correspondence points in the reference image 230. The image recognition section 125 votes for the pixel at the estimated central position among pixels in the reference image 230 (Step S41b). For example, the number of votes is managed using a vote map 240.

The hue feature points in the key image 220 are processed in a similar manner. That is, the image recognition section 125 processes each hue feature point in the key image 220 as follows. The image recognition section 125 estimates the central position of the key image 220 in the reference image 230 when the reference image 230 and the key image 220 overlap each other such that the hue feature points in the key image 220 match the correspondence points in the reference image 230. The image recognition section 125 votes for the pixel at the estimated central position among the pixels in the reference image 230 (Step S42b). The number of votes is managed using the common vote map 240.

Based on such vote result, the image recognition section 125 distinguishes the pixel of the maximum number of votes among the pixels in the reference image 230, and when the number of votes of the distinguished pixel exceeds a predetermined threshold value, determines that the reference image 230 is an image that resembles the key image 220.

Figure 13:
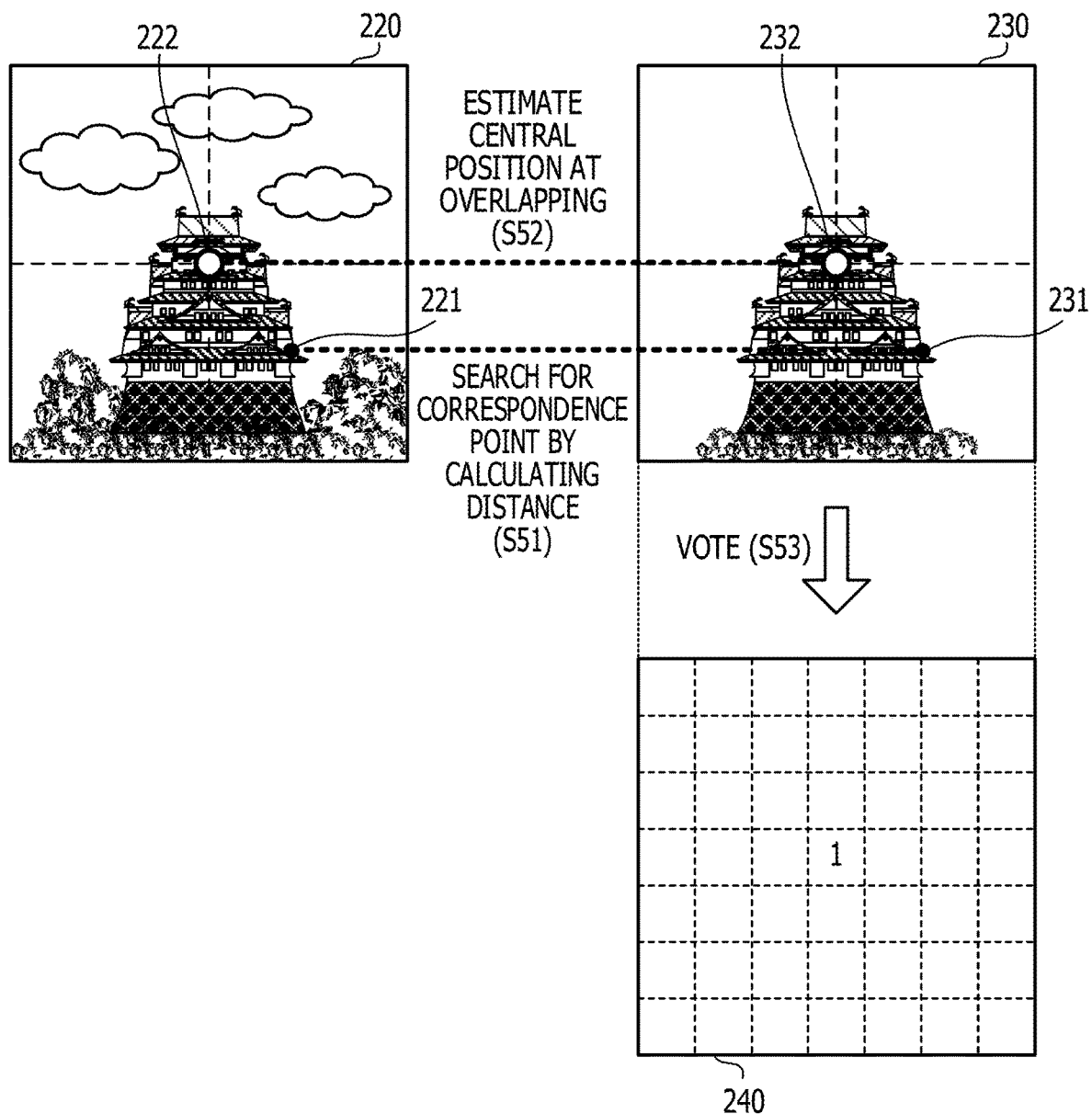
FIG. 13 is a view for describing voting processing.

FIG. 13 is a view for describing voting processing. FIG. 13 illustrates an example of the processing of searching for a correspondence point in the reference image 230, which resembles a feature point 221 in the key image 220. The feature point 221 is either the luminance feature point or the hue feature point. For example, the image recognition section 125 calculates Hamming distance between the local feature quantity of the feature point 221 in the key image 220 and the local feature quantity of each feature point in the reference image 230 to search for the correspondence point (Step S51).

It is assumed that a feature point 231 in the reference image 230 is extracted as the correspondence point to the feature point 221 in the key image 220. At this time, the image recognition section 125 estimates a central position 222 of the key image 220 in the reference image 230 when the reference image 230 and the key image 220 overlap each other such that the feature point 221 matches the feature point 231 (correspondence point) (Step S52).

Here, the number of pixels in width and the number of pixels in height of the reference image are defined as wi, hi, respectively, and the number of pixels in width and the number of pixels in height of the key image are defined as wr, hr, respectively. Given that the feature point (xi, yi) in the reference image is searched as the correspondence point in the reference image, which corresponds to the feature point (xr, yr) in the key image, the position (xv, yv) of the central point of the key image in the reference image is calculated using following equations (1) and (2).

$$xv = xi \times xr + (wr/2) \quad (1)$$

$$yv = yi \times yr + (hr/2) \quad (2)$$

Given that a pixel 232 is estimated as the central position of the key image 220 in the reference image 230, based on the correspondence between the feature point 221 and the feature point 231 in FIG. 13, the image recognition section 125 votes for the pixel 232 among pixels in the reference image 230. This voting processing uses the above-mentioned vote map 240. The vote map 240 has entries corresponding to pixels of the reference image 230. An initial value of each entry of the vote map 240 is set to 0. In the processing illustrated in FIG. 13, 1 is added to the entry corresponding to the pixel 232 in the vote map 240 (Step S53).

In practice, the image recognition section 125 may vote for each pixel included in a predetermined region around the pixel 232 (for example, a rectangular region of 10 pixels square). This enables robust recognition processing with respect to the difference between the key image 220 and the reference image 230.

Figure 14:
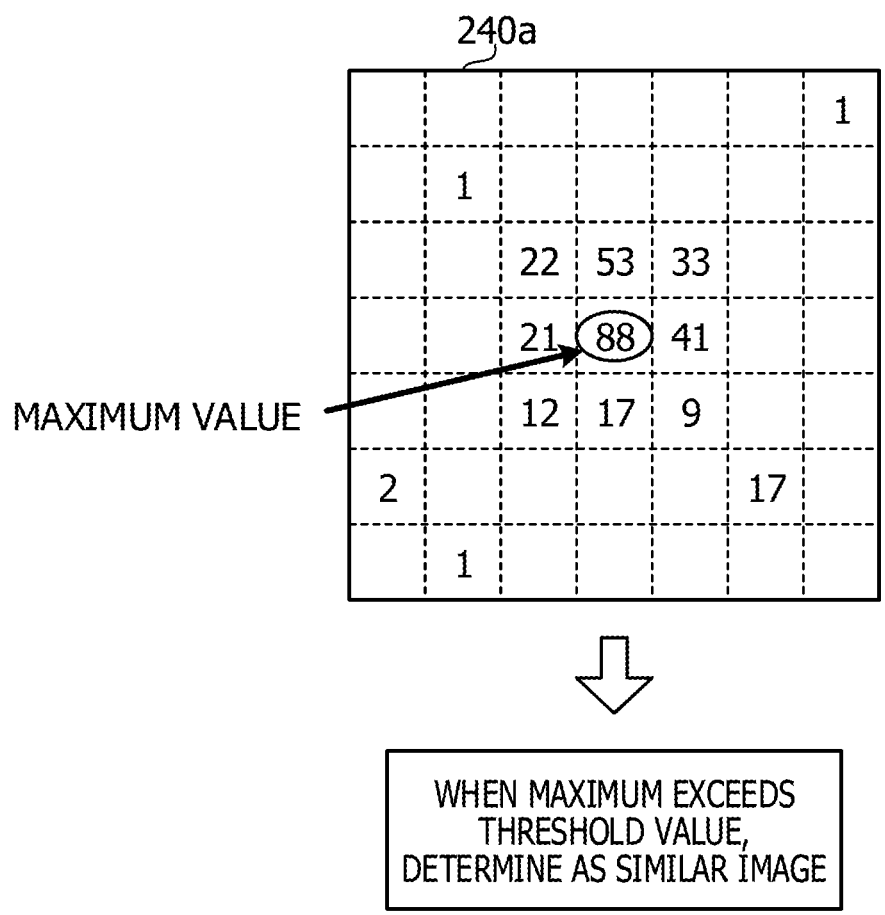
FIG. 14 is a view for describing similar image determination processing based on a vote result.

FIG. 14 is a view for describing similar image determination processing based on the vote result. The vote map 240a illustrated in FIG. 14 represents of the vote map 240 in the state where the processing illustrated in FIG. 13 is applied to each feature point in the key image 220. The image recognition section 125 extracts a maximum value of the number of votes on each pixel of the vote map 240a, and determines whether or not the maximum value exceeds a predetermined threshold value.

When the same object is in the key image 220 and the reference image 230, the relational relationship between the feature point in the key image 220 and the correspondence point in the reference image 230 tends to be the same as each other in the feature points in the key image. In this case, the number of votes concentrates on the entry corresponding to the same pixel of the vote map 240a. On the contrary, when the relationship between the key image 220 and the reference image 230 is low, the relational relationship between the feature point in the key image 220 and the correspondence point in the reference image 230 tends to be different from each other in the feature points in the key image 220. In this case, the number of votes is dispersed in the vote map 240a.

Accordingly, when the maximum value of the number of votes in the vote map 240a exceeds the threshold value, it is estimated that the number of votes concentrates on the same pixel. Thus, it is likely that the same object is in the key image 220 and the reference image 230. Therefore, when the maximum value of the number of votes exceeds the threshold value, the image recognition section 125 determines that the reference image 230 resembles the key image 220.

In practice, since the maximum value of the number of votes is affected by the number of the feature points in the reference image 230, for example, it is desired that the maximum value is normalized by division of the number of votes by the number of feature points in the reference image 230 and then, is compared with the threshold value.

<Flow Charts>

Next, processing executed by the image processing apparatus 100 will be described using flow charts.

Figure 15:
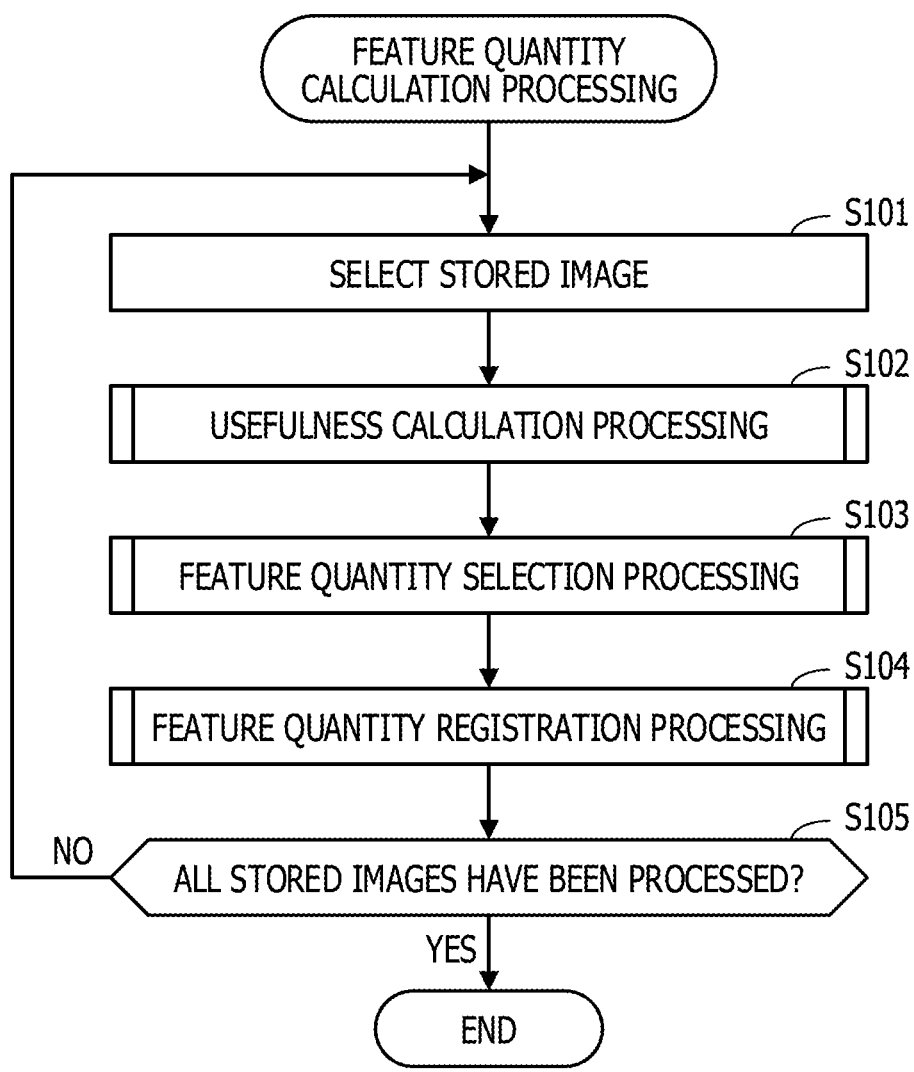
FIG. 15 is a flow chart illustrating an example of feature quantity calculation processing.

FIG. 15 is a flow chart illustrating an example of feature quantity calculation processing.

[Step S101] The feature quantity calculation section 124 selects one stored image.

[Step S102] The usefulness calculation section 122 calculates the degree of usefulness of the luminance feature quantity and the degree of usefulness of the hue feature quantity at each feature point in the stored image.

[Step S103] Based on the degree of usefulness calculated in Step S102, the feature quantity selection section 123 selects either the luminance feature quantity or the hue feature quantity as the local feature quantity corresponding to each feature point in the stored image. That is, the feature quantity selection section 123 classifies each feature point in the stored image as the luminance feature point or the hue feature point.

[Step S104] The feature quantity calculation section 124 calculates the luminance feature quantity at the luminance feature point, and registers the calculated luminance feature quantity in the luminance feature quantity management table 114 corresponding to the selected stored image. The feature quantity calculation section 124 calculates the at the hue feature point, and registers the calculated hue feature quantity in the hue feature quantity management table 115 corresponding to the selected stored image.

[Step S105] The feature quantity calculation section 124 determines whether or not the processing in Steps S101 to S104 is applied to all stored images stored in the storage section 110. When any unprocessed stored image is present, the feature quantity calculation section 124 executes the processing in Step S101, and selects one unprocessed stored image. On the contrary, when all stored images have been processed, the feature quantity calculation section 124 terminates the processing.

Figure 16:
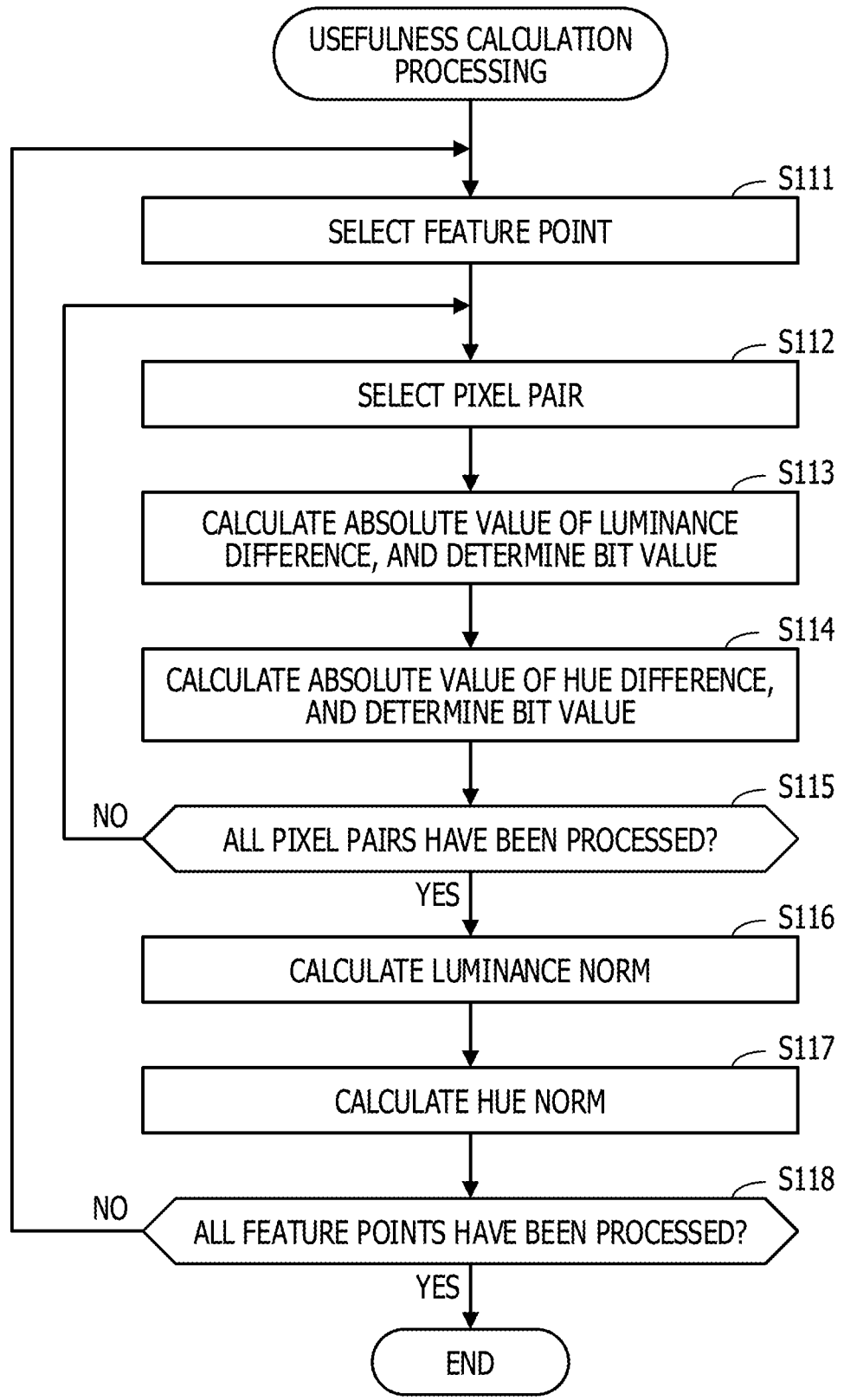
FIG. 16 is a flow chart illustrating an example of usefulness calculation processing.

FIG. 16 is a flow chart illustrating an example of usefulness calculation processing. The processing illustrated in FIG. 16 corresponds to the processing in Step S102 in FIG. 15.

[Step S111] The usefulness calculation section 122 selects one feature point from the stored image selected in Step S101.

[Step S112] The usefulness calculation section 122 selects one pixel pair from the pixel pair management table 112.

[Step S113] The usefulness calculation section 122 selects two pixels corresponding to the pixel pair selected in Step S112 from a feature region having a certain scope around the feature point selected in Step S111, and calculates the absolute value of the luminance difference between the selected pixels. The luminance difference is calculated by subtracting a luminance value of the second pixel from a luminance value of the first pixel in the pixels included in the pixel pair.

The usefulness calculation section 122 compares the calculated absolute value of the luminance difference with a predetermined threshold value more than 0. The usefulness calculation section 122 determines the bit value as "1" when the absolute value of the luminance difference is equal to or greater than the threshold value, and determines the bit value as "0" when the absolute value of the luminance difference is smaller than the threshold value. The usefulness calculation section 122 adds the determined bit value to a low-order bit in the bit string indicating the luminance absolute vector corresponding to the luminance feature point.

[Step S114] The usefulness calculation section 122 selects two pixels corresponding to the pixel pair selected in Step S112 from a feature region having a certain scope around the feature point selected in Step S111, and calculates the absolute value of the hue difference between the selected pixels. The hue difference is calculated by subtracting a hue value of the second pixel from a hue value of the first pixel in the pixels included in the pixel pair.

The usefulness calculation section 122 compares the absolute value of the calculated hue difference with a predetermined threshold value more than 0. The usefulness calculation section 122 determines the bit value as 1 when the absolute value of the hue difference is equal to or greater than the threshold value, and determines the bit value as 0 when the absolute value of the hue difference is smaller than the threshold value. The usefulness calculation section 122 adds the determined bit value to a low-order bit in the bit string indicating the hue absolute vector corresponding to the hue feature point.

[Step S115] The usefulness calculation section 122 determines whether or not the processing in Steps S112 to S114 is applied to all pixel pairs registered in the pixel pair management table 112. When any unprocessed pixel pair is present, the usefulness calculation section 122 executes the processing in Step S112, and selects the unprocessed pixel pair.

On the contrary, when all pixel pairs have been processed, the usefulness calculation section 122 identifies a record corresponding to the feature point selected from the intermediate data management table 113 in Step S111. The usefulness calculation section 122 registers the luminance absolute vector generated in the processing in Step S113 and the hue absolute vector generated in the processing in Step S114 in the registered record. Then, the usefulness calculation section 122 executes processing in Step S116.

[Step S116] The usefulness calculation section 122 calculates a norm of the luminance absolute vector as the luminance norm, and registers the calculated norm in the record identified in Step S115.

[Step S117] The usefulness calculation section 122 calculates a norm of the hue absolute vector as the hue norm, and registers the calculated norm in the record identified in Step S115.

[Step S118] The usefulness calculation section 122 determines whether or not the processing in Steps S111 to S117 is applied to all feature points. When any unprocessed feature point is present, the usefulness calculation section 122 executes the processing in Step S111, and selects the unprocessed feature point. On the contrary, when all feature points have been processed, usefulness calculation section 122 terminates the processing.

Through the above-mentioned processing illustrated in FIG. 16, on all feature points, luminance norm indicating the degree of usefulness of the luminance feature quantity and the hue norm indicating the degree of usefulness of the hue feature quantity are registered in the intermediate data management table 113 corresponding to the stored image.

Figure 17:
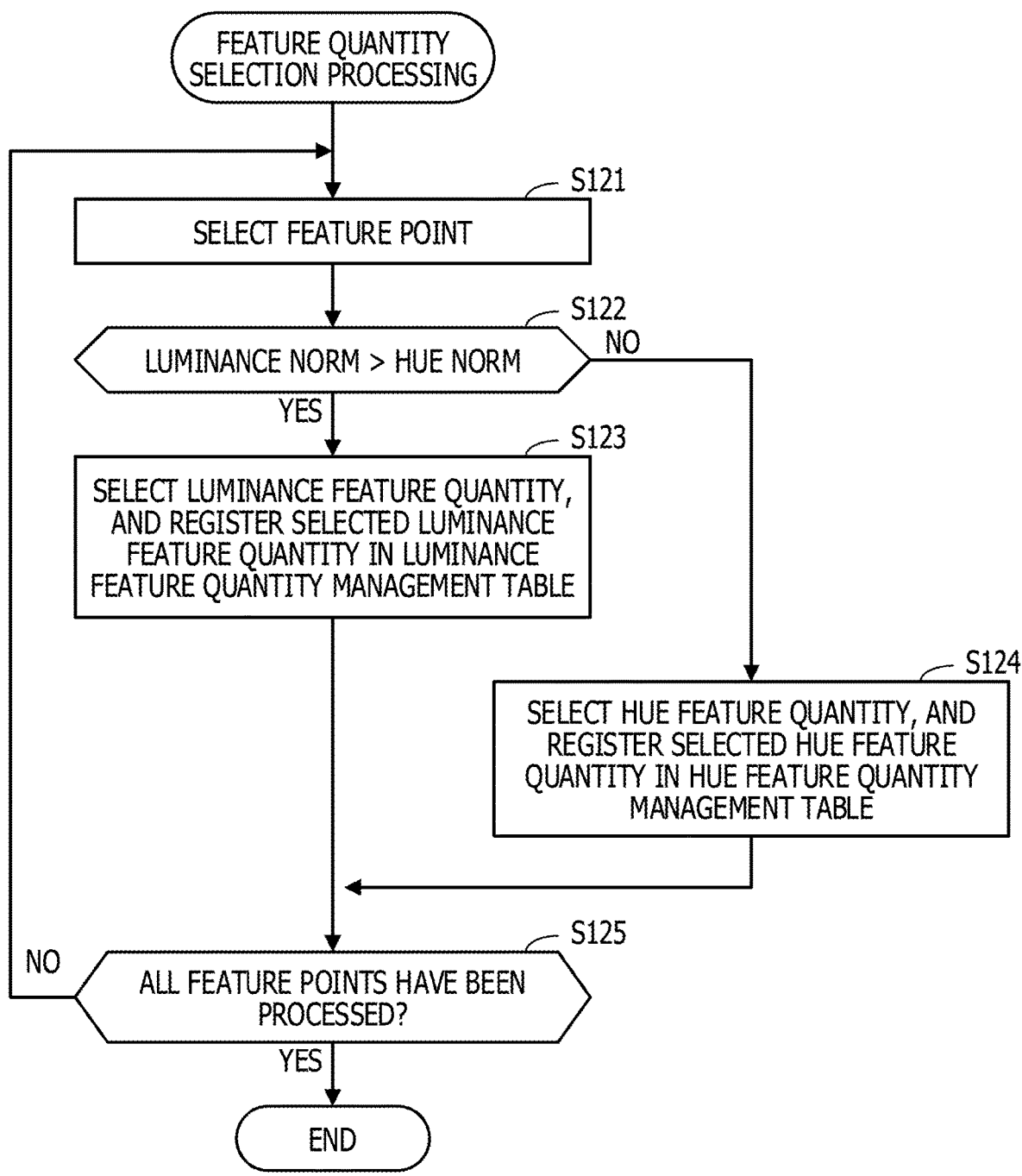
FIG. 17 is a flow chart illustrating an example of feature quantity selection processing.

FIG. 17 is a flow chart illustrating an example of feature quantity selection processing. The processing illustrated in FIG. 17 corresponds to the processing in Step S103 in FIG. 15.

[Step S121] The feature quantity selection section 123 selects one feature point from the stored image selected in Step S101. In practice, the feature quantity selection section 123 selects one record from the intermediate data management table 113 created in the processing illustrated in FIG. 16.

[Step S122] The feature quantity selection section 123 reads the luminance norm and the hue norm from the record selected in Step S121, and determines whether or not the luminance norm is larger than the hue norm. The feature quantity selection section 123 executes processing in Step S123 when the luminance norm is larger than the hue norm, and executes processing in Step S124 when the luminance norm is equal to or smaller than the hue norm.

[Step S123] The feature quantity selection section 123 selects the luminance feature quantity as the local feature quantity corresponding to the feature point selected in Step S121. At this time, the feature quantity selection section 123 adds one record to the luminance feature quantity management table 114 corresponding to the stored image selected in Step S101. The feature quantity selection section 123 registers an ID of the feature point selected in Step S121 and coordinates of the feature point in the added record.

[Step S124] The feature quantity selection section 123 selects the hue feature quantity as the local feature quantity corresponding to the feature point selected in Step S121. At this time, the feature quantity selection section 123 adds one record to the hue feature quantity management table 115 corresponding to the stored image selected in Step S101. The feature quantity selection section 123 registers an ID of the feature point selected in Step S121 and coordinates of the feature point in the added record.

[Step S125] The feature quantity selection section 123 determines whether or not processing in Steps S121 to S124 is applied to all feature points. When any unprocessed feature point is present, the feature quantity selection section 123 executes the processing in Step S121, and selects the unprocessed feature point. On the contrary, when all feature points have been processed, the feature quantity selection section 123 terminates the processing.

Through the above-mentioned processing illustrated in FIG. 17, all feature points in the stored image are classified as the luminance feature point and the hue feature point based on comparison of the degree of usefulness. In Step S123, coordinates of the feature point classified as the luminance feature point are registered in the luminance feature quantity management table 114, and in Step S124, coordinates of the feature point classified as the hue feature point are registered in the hue feature quantity management table 115. Then, through next processing illustrated in FIG. 18, the local feature quantities corresponding to the luminance feature point and the hue feature point are calculated, and are registered in the luminance feature quantity management table 114 and the hue feature quantity management table 115, respectively.

Figure 18:
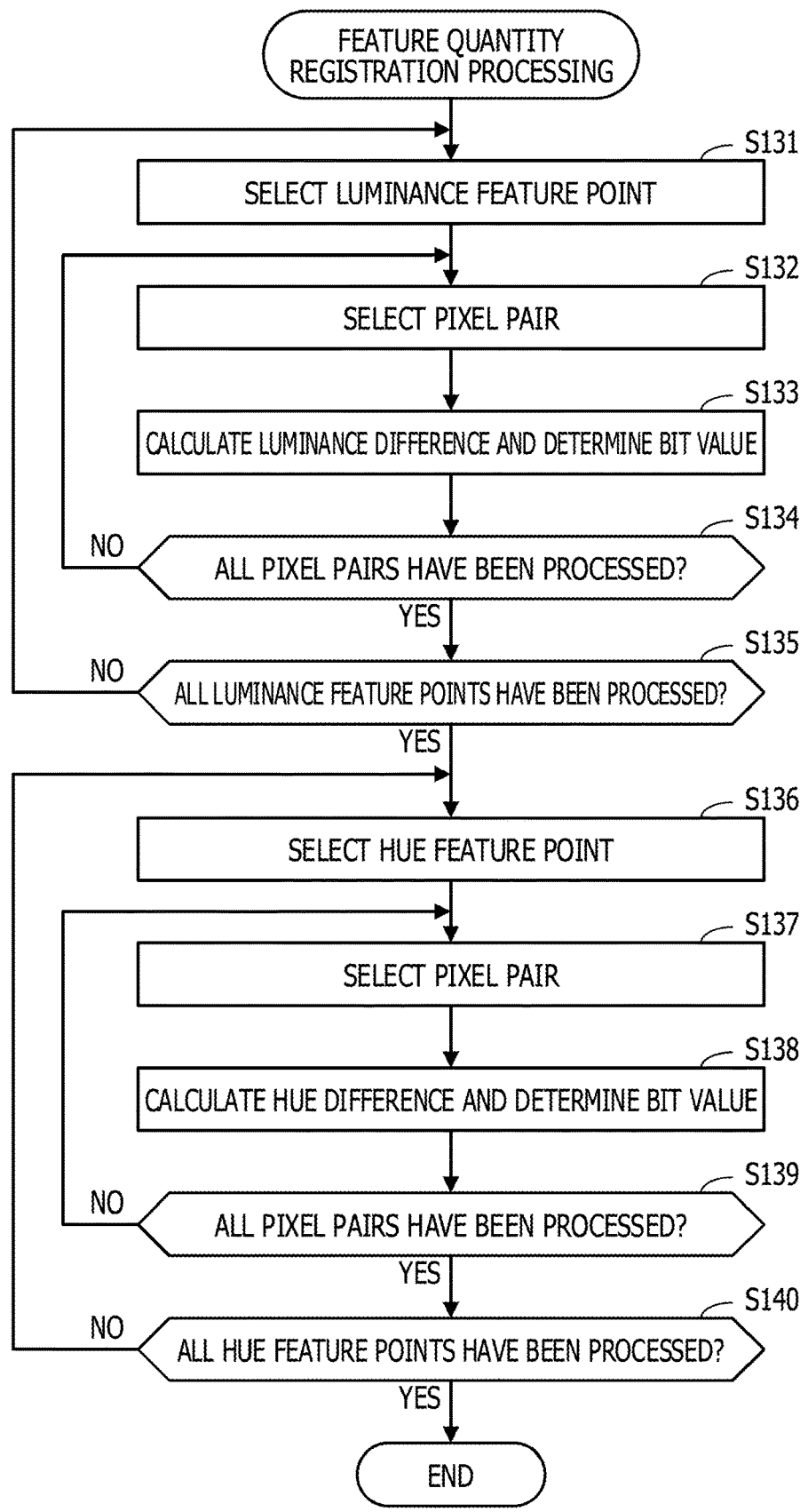
FIG. 18 is a flow chart illustrating an example of feature quantity registration processing.

FIG. 18 is a flow chart illustrating an example of feature quantity registration processing. The processing illustrated in FIG. 18 corresponds to the processing in Step S104 in FIG. 15.

[Step S131] The feature quantity calculation section 124 selects one luminance feature point from the stored image selected in Step S101. In practice, the feature quantity calculation section 124 selects one record from the luminance feature quantity management table 114 corresponding to the stored image selected in Step S101.

[Step S132] The feature quantity calculation section 124 selects one pixel pair from the pixel pair management table 112.

[Step S133] The feature quantity calculation section 124 selects two pixels corresponding to the pixel pair selected in Step S132 from a feature region having a certain scope around the luminance feature point selected in Step S131, and calculates the luminance difference between the selected pixels. The luminance difference is calculated by subtracting a luminance value of the second pixel from a luminance value of the first pixel in the pixels included in the pixel pair.

The feature quantity calculation section 124 determines the bit value as 1 when the calculated luminance difference is larger than 0, and determines the bit value as 0 when the calculated luminance difference is equal to or smaller than 0. The feature quantity calculation section 124 adds the determined bit value to a low-order bit in the bit string indicating the luminance feature quantity corresponding to the luminance feature point.

[Step S134] The feature quantity calculation section 124 determines whether or not the processing in Steps S132 and S133 is applied to all pixel pairs registered in the pixel pair management table 112. When any unprocessed pixel pair is present, the feature quantity calculation section 124 executes the processing in Step S132, and selects the unprocessed pixel pair.

On the contrary, when all pixel pairs have been processed, the generation of the bit string in Step S133 is completed. In this case, the feature quantity calculation section 124 registers the generated bit string as the luminance feature quantity in the record selected from the luminance feature quantity management table 114 in Step S131.

[Step S135] The feature quantity calculation section 124 determines whether or not the processing in Steps S131 to S134 is applied to all luminance feature points. When any unprocessed luminance feature point is present, the feature quantity calculation section 124 executes the processing in Step S131, and selects the unprocessed luminance feature point. On the contrary, when all luminance feature points have been processed, the feature quantity calculation section 124 executes processing in Step S136.

[Step S136] The feature quantity calculation section 124 selects one hue feature point from the stored image selected in Step S101. In practice, the feature quantity calculation section 124 selects one record from the hue feature quantity management table 115 corresponding to the stored image selected in Step S101.

[Step S137] The feature quantity calculation section 124 selects one pixel pair from the pixel pair management table 112.

[Step S138] The feature quantity calculation section 124 selects two pixels corresponding to the pixel pair selected in Step S137 from a feature region having a certain scope around the hue feature point selected in Step S136, and calculates the hue difference between the selected pixels. The hue difference is calculated by subtracting a hue value of the second pixel from a hue value of the first pixel in the pixels included in the pixel pair.

The feature quantity calculation section 124 determines the bit value as 1 when the calculated hue difference is larger than 0, and determines the bit value as 0 when the calculated hue difference is equal to or smaller than 0. The feature quantity calculation section 124 adds the determined bit value to a low-order bit in the bit string indicating the hue feature quantity corresponding to the hue feature point.

[Step S139] The feature quantity calculation section 124 determines whether or not the processing in Steps S137 and S138 is applied to all pixel pairs registered in the pixel pair management table 112. When any unprocessed pixel pair is present, the feature quantity calculation section 124 executes the processing in Step S137, and selects the unprocessed pixel pair.

On the contrary, when all pixel pairs have been processed, the generation of the bit string in Step S138 is completed. In this case, the feature quantity calculation section 124 registers the generated bit string as the hue feature quantity in the record selected from the hue feature quantity management table 115 in Step S136.

[Step S140] The feature quantity calculation section 124 determines whether or not the processing in Steps S136 to S139 is applied to all hue feature points. When any unprocessed hue feature point is present, the feature quantity calculation section 124 executes the processing in Step S136, and selects the unprocessed hue feature point. On the contrary, when all hue feature points have been processed, feature quantity calculation section 124 terminates the processing.

Through the above-mentioned processing illustrated in FIG. 18, on all feature points in the stored image, either the luminance feature quantity or the hue feature quantity is calculated, and is registered in the storage section 110.

Figure 19:
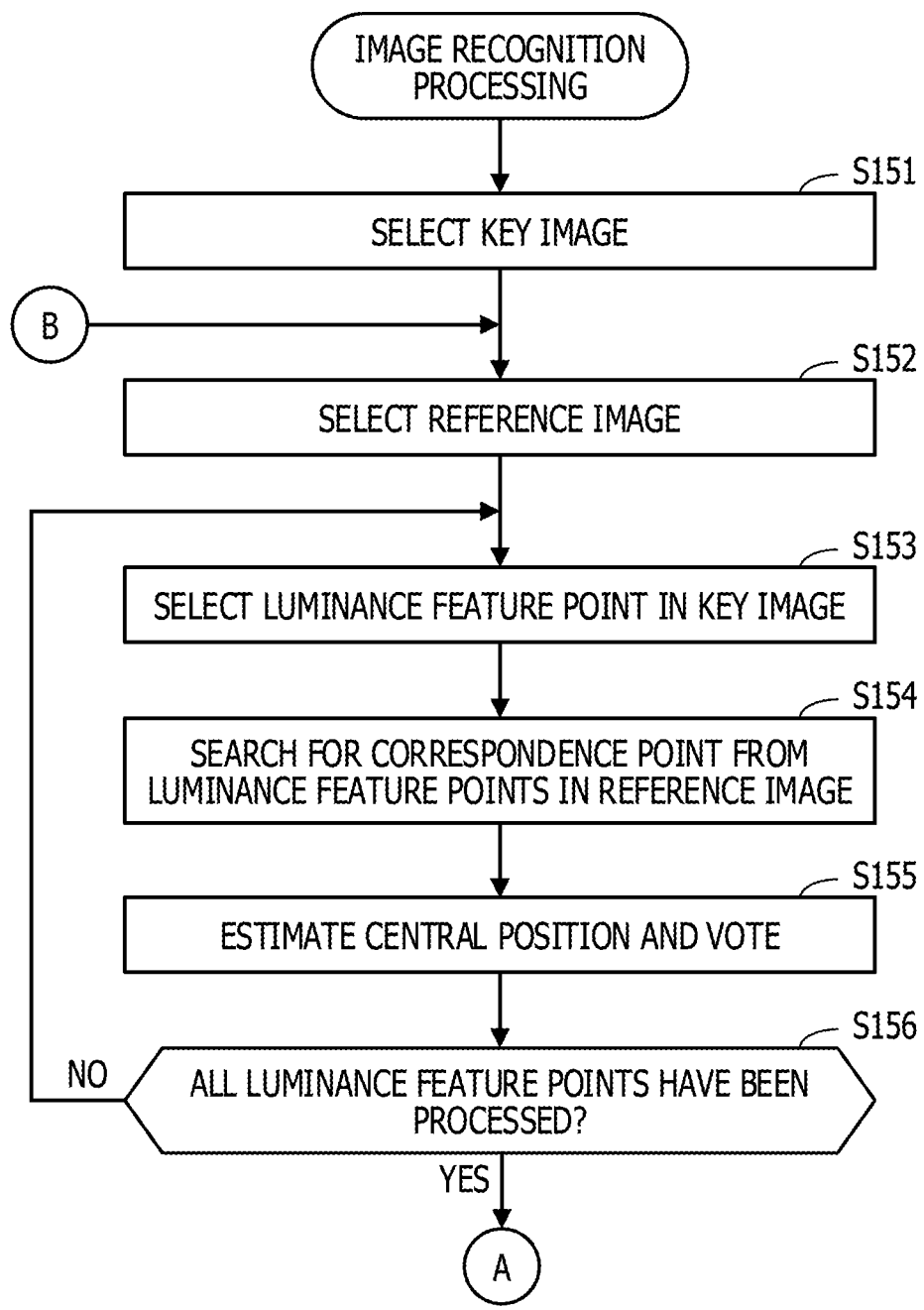
FIG. 19 is a flow chart illustrating an example of image recognition processing (1)
Figure 20:
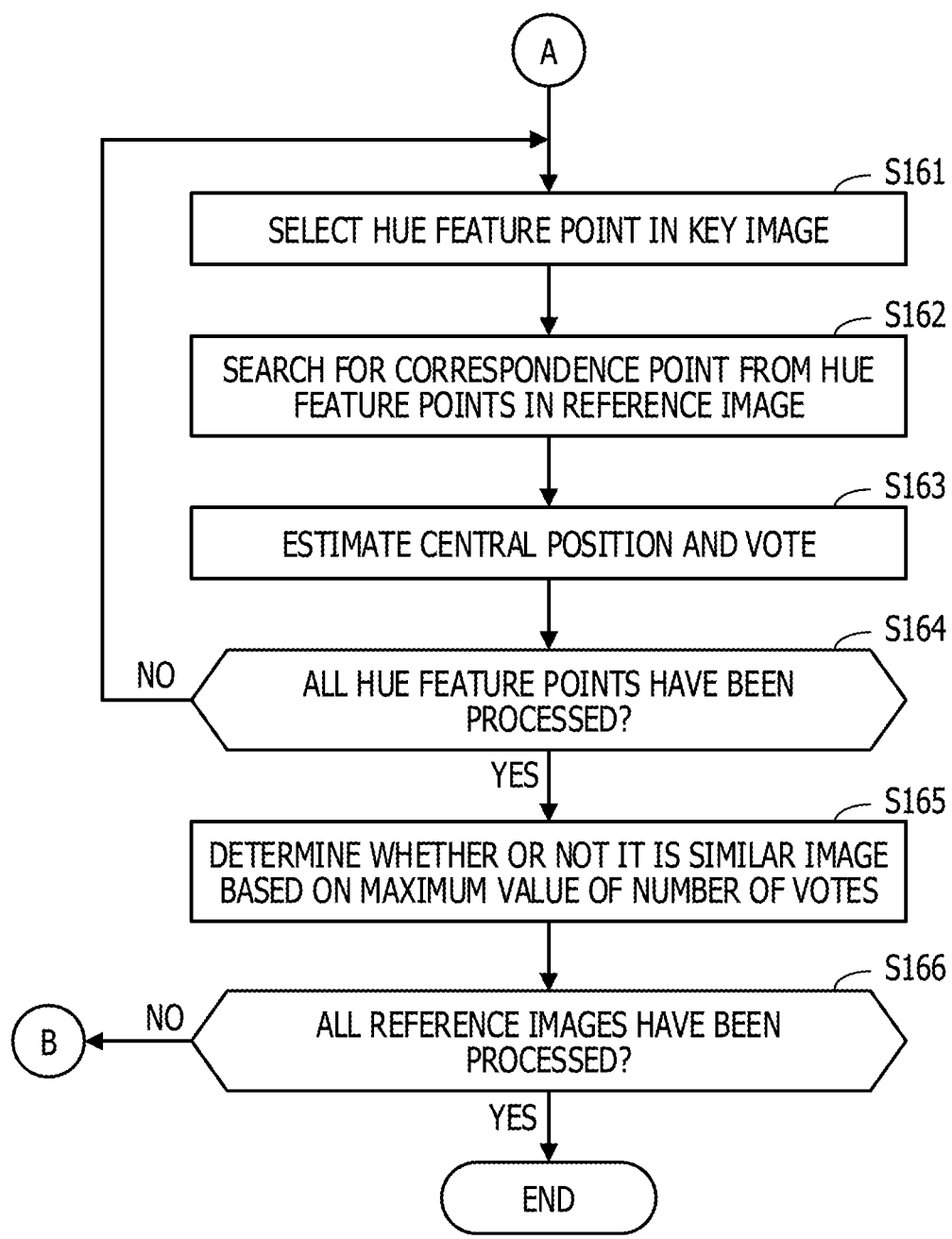
FIG. 20 is a flow chart illustrating an example of image recognition processing (2)

FIGS. 19 and 20 are flow charts illustrating an example of image recognition processing.

[Step S151] In response to an input of the user, the image recognition section 125 selects the key image from the stored images.

[Step S152] The image recognition section 125 selects one image from the stored images (reference images) other than the key image.

[Step S153] Based on the luminance feature quantity management table 114 of the key image, the image recognition section 125 selects one luminance feature point in the key image.

[Step S154] The image recognition section 125 searches for the feature point (correspondence point) that resembles the luminance feature point selected in the key image in Step S153 from luminance feature points in the reference image selected in Step S152. According to this processing, the image recognition section 125 refers to the luminance feature quantity management table 114 corresponding to the key image and the luminance feature quantity management table 114 corresponding to the reference image. The image recognition section 125 calculates Hamming distance between the luminance feature quantity of the luminance feature point selected in the key image and the luminance feature quantity corresponding to each luminance feature point in the reference image, and extracts the feature point having a minimum Hamming distance among the luminance feature points in the reference image, as the correspondence point having the highest similarity.

[Step S155] The image recognition section 125 estimates a central position of the key image in the reference image when the reference image and the key image overlap each other such that the luminance feature point selected in Step S153 matches the correspondence point searched in Step S154. The image recognition section 125 votes for a pixel at the estimated central position among the pixels of the reference image. In practice, the image recognition section 125 may vote for each pixel included in a predetermined region around the estimated central position (for example, a rectangular region of 10 pixels square).

[Step S156] The image recognition section 125 determines whether or not the processing in Steps S153 to S155 is applied to all luminance feature points in the key image. When any unprocessed luminance feature point is present, the image recognition section 125 executes the processing in Step S153, and selects the unprocessed luminance feature point. On the contrary, when all luminance feature points have been processed, the image recognition section 125 executes the processing in Step S161 in FIG. 20.

The following description is made with reference to FIG. 20.

[Step S161] Based on the hue feature quantity management table 115 of the key image, the image recognition section 125 selects one hue feature point in the key image.

[Step S162] The image recognition section 125 searches for the feature point (correspondence point) that resembles the hue feature point selected in the key image in Step S161 from the hue feature point in the reference image selected in Step S152. In this processing, the image recognition section 125 refers to the hue feature quantity management table 115 corresponding to the key image and the hue feature quantity management table 115 corresponding to the reference image. The image recognition section 125 calculates Hamming distance between the hue feature quantity corresponding to the hue feature point selected in the key image and the hue feature quantity corresponding to each hue feature point in the reference image, and extracts the feature point having a minimum Hamming distance among the hue feature points in the reference image, as the correspondence point having the highest similarity.

[Step S163] The image recognition section 125 estimates a central position of the key image in the reference image when the reference image and the key image overlap each other such that the hue feature point selected in Step S161 match the correspondence point searched in Step S162. The image recognition section 125 votes for the pixel at the estimated central position among the pixels of the reference image. In practice, the image recognition section 125 may vote for each pixel included in a predetermined region around the estimated central position (for example, a rectangular region of 10 pixels square).

[Step S164] The image recognition section 125 determines whether or not the processing in Steps S161 to S163 is applied to all hue feature points in the key image. When any unprocessed hue feature point is present, the image recognition section 125 executes the processing in Step S161, and selects the unprocessed hue feature point. On the contrary, when all hue feature points have been processed, the image recognition section 125 executes the processing in Step S165.

[Step S165] When the maximum value of the number of votes on each pixel in the reference image selected in Step S152 exceeds a predetermined threshold value, the image recognition section 125 determines that the reference image is an image that resembles the key image. In this case, the image recognition section 125 outputs, for example, ID information of the reference image determined as resembling the key image. On the contrary, when the maximum value of the number of votes is equal to or smaller than the threshold value, the image recognition section 125 determines that the reference image is an image that does not resemble the key image.

In Step S165, the image recognition section 125 may output ID information on all reference images having the maximum value of the number of votes, which exceeds the predetermined threshold value, in decreasing order of the number of votes. In this case, the number of votes represents the similarity between the key image and the reference image.

[Step S166] The image recognition section 125 determines whether or not the processing in Steps S152 to S156 and S161 to S165 is applied to all reference images. When any unprocessed reference image is present, the image recognition section 125 executes the processing in Step S152, and selects one reference image. On the contrary, when all reference images have been processed, image recognition section 125 terminates the processing.

In the above-mentioned image processing apparatus 100, the feature point in the stored image are classified as the luminance feature point having a higher stability in the local feature quantity when using the luminance feature quantity or the hue feature point having a higher stability in the local feature quantity when using the hue feature quantity. Thereby, even in the case where the luminance difference between pixels in the feature region corresponding to the feature point is small, when the hue difference between the pixels is large, the stable local feature quantity that is resistant to a change in illumination conditions and noise may be calculated.

Then, in determining the similarity between the key image and the reference image that are selected from stored images, the correspondence point corresponding to each luminance feature point in the key image is extracted from the luminance feature points in the reference image. Similarly, the correspondence point corresponding to each hue feature point in the key image is extracted from the hue feature points in the reference image. The luminance feature quantity is used when extracting the correspondence point of the luminance feature point, and the hue feature quantity is used when extracting the correspondence point of the hue feature point.

Since the stable local feature quantities in the key image and the reference image are calculated as described above, the correspondence point extraction accuracy is improved. This may improve the accuracy of determining the similarity between the images.

The luminance feature quantity or the hue feature quantity, which has a higher degree of usefulness, is calculated as local feature quantity at each feature point. For this reason, as compared to the case of using both the luminance feature quantity and the hue feature quantity as the local feature quantities, calculation loads of the local feature quantity may be reduced to shorten processing time.

<Modification Example of Feature Quantity Selection Processing>

Figure 21:
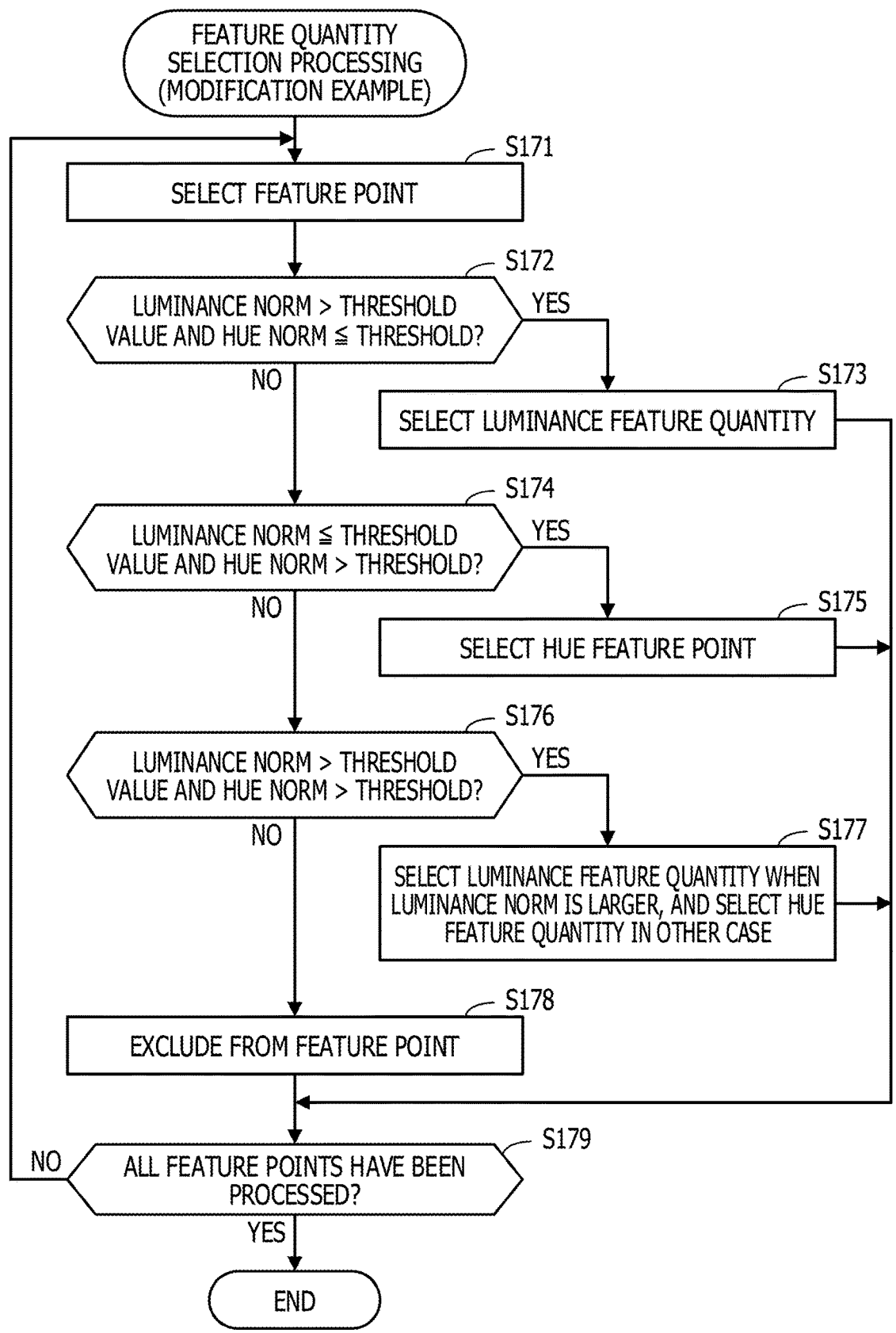
FIG. 21 is a flow chart illustrating a modification of feature quantity selection processing.

The feature quantity selection processing illustrated in FIG. 17 may be modified as illustrated in FIG. 21. In the processing illustrated in FIG. 17, based on values of the luminance norm and the hue norm, the luminance feature quantity or the hue feature quantity is selected as the local feature quantity. On the contrary, in a modification example illustrated in FIG. 21, for the feature point at which both the luminance norm and the hue norm are equal to or smaller than a predetermined threshold value, a corresponding local feature quantity is not registered in the storage section 110 so as not to use the local feature quantity in the image recognition processing. Thereby, only the luminance feature quantity or the hue feature quantity that is estimated to be stable to some extent, may be used in the image recognition processing to improve the image recognition accuracy.

FIG. 21 is a flow chart illustrating a modification of feature quantity selection processing. The processing illustrated in FIG. 21 is executed in place of the processing illustrated in FIG. 17.

[Step S171] The feature quantity selection section 123 selects one feature point from the stored image selected in Step S101. In practice, the feature quantity selection section 123 selects one record from the intermediate data management table 113 executed in the processing in FIG. 16. Then, the feature quantity selection section 123 reads the luminance norm and the hue norm from the selected record.

[Step S172] The feature quantity selection section 123 determines whether or not a determination condition that the luminance norm is a predetermined threshold value, and the hue norm is equal to or smaller than the threshold value is satisfied. The threshold value is set to a value more than 0. The feature quantity selection section 123 executes processing in Step S173 when the determination condition is satisfied, and executes processing in Step S174 when the determination condition is not satisfied.

[Step S173] The feature quantity selection section 123 selects the luminance feature quantity as the local feature quantity corresponding to the feature point selected in Step S171. At this time, the feature quantity selection section 123 adds one record to the luminance feature quantity management table 114 corresponding to the stored image selected in Step S101. The feature quantity selection section 123 registers the ID indicating the feature point selected in Step S171 and coordinates of the feature point. After that, the feature quantity selection section 123 executes processing in Step S179.

[Step S174] The feature quantity selection section 123 determines whether or not a determination condition that the luminance norm is equal to or smaller than the threshold value and the hue norm is larger than the threshold value is satisfied. The feature quantity selection section 123 executes processing in Step S175 when the determination condition is satisfied, and executes processing in Step S176 when the determination condition is not satisfied.

[Step S175] The feature quantity selection section 123 selects the hue feature quantity as the local feature quantity corresponding to the feature point selected in Step S171. At this time, the feature quantity selection section 123 adds one record to the hue feature quantity management table 115 corresponding to the stored image selected in Step S101. The feature quantity selection section 123 registers the ID indicating the feature point selected in Step S171 and coordinates of the feature point in the added record. After that, the feature quantity selection section 123 executes processing in Step S179.

[Step S176] The feature quantity selection section 123 determines whether or not a determination condition that the luminance norm is larger than the threshold value and the hue norm is also larger than the threshold value. The feature quantity selection section 123 executes processing in Step S177 when the determination condition is satisfied, and executes processing in Step S178 when the determination condition is not satisfied.

[Step S177] The feature quantity selection section 123 compares the luminance norm with the hue norm. When the luminance norm is larger, the feature quantity selection section 123 selects the luminance feature quantity as the local feature quantity corresponding to the feature point selected in Step S171. In this case, in the similar manner to Step S173, a record is added to the luminance feature quantity management table 114, and an ID and coordinates are registered. On the contrary, when the luminance norm is equal to or smaller than the hue norm, the feature quantity selection section 123 selects the hue feature quantity as the local feature quantity corresponding to the feature point selected in Step S171. In this case, in the similar manner to Step S175, a record is added to the hue feature quantity management table 115, and an ID and coordinates are registered.

After that, the feature quantity selection section 123 executes the processing in Step S179.

As another example, in Step S177, either the luminance feature quantity or the hue feature quantity may be previously selected as the local feature quantity corresponding to the feature point selected in Step S171.

[Step S178] The feature quantity selection section 123 selects neither the luminance feature quantity nor the hue feature quantity as the local feature quantity corresponding to the feature point selected in Step S171. In this case, a record corresponding to the feature point selected in Step S171 is registered neither in the luminance feature quantity management table 114 nor the hue feature quantity management table 115. Thereby, the feature point selected in Step S171 is excluded from an object to be extracted as the correspondence point in the image recognition processing, and the local feature quantity corresponding to the feature point is not used in the image recognition processing.

[Step S179] The feature quantity selection section 123 determines whether or not the processing in Steps S171 to S178 is applied to all feature points. When any unprocessed feature point is present, the feature quantity selection section 123 executes the processing in Step S171, and selects the unprocessed feature point. On the contrary, when all feature points have been processed, the feature quantity selection section 123 terminates the processing.

In the above-mentioned processing illustrated in FIG. 21, only the luminance feature quantity or the hue feature quantity that is stable to some extent is used in the image recognition processing, improving the image recognition accuracy.

Processing functions of the apparatuses in above-mentioned embodiments (the image similarity determination apparatus 1 and the image processing apparatus 100) may be implemented by a computer. In this case, a program describing processing contents of the functions in the apparatuses is provided, and the program is performed by the computer to implement the processing functions on the computer. The program describing the processing contents may be recorded in a computer-readable recording medium. Examples of the computer-readable recording medium include a magnetic memory, an optical disc, a magneto-optical recording medium, and a semiconductor memory. Examples of the magnetic memory includes a hard disc device (HDD), a flexible disc (FD), and a magnetic tape. Examples of the optical disc include a digital versatile disc (DVD), a DVD-RAM, a compact disc-read only memory (CD-ROM), and a CD-R (Recordable)/RW (ReWritable). Examples of the magneto-optical recording medium include a magneto-optical disk (MO).

To put the program into circulation, for example, a portable recording medium, such as DVD and CD-ROM, which records the program is sold. The program may be stored in a memory of a server computer, and may be also transferred from the server computer to other computers via a network.

The computer that performs the program stores its own memory in the program recorded in the portable recording medium or the program transferred from the server computer. Then, the computer reads the program from its own memory, and executes processing according to the program. The computer directly may read the program from the portable recording medium, and execute the processing according to the program. Each time the program is transferred from the server computer connected via the network, the computer may execute the processing according to the transferred program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image similarity determination apparatus comprising:
 a memory; and
 a processor coupled to the memory and the processor configured to acquire a first image and a second image;
 perform selection of a first group and a second group from a plurality of feature points included in the first image and perform selection of a third group and a fourth group from a plurality of feature points included in the second image;
 calculate feature quantity for each feature point included in the first group and the third group on the basis of luminance and calculate feature quantity for each feature point included in the second group and the fourth group on the basis of hue; and
 determine similarity between the first image and the second image on the basis of both first comparison of first feature quantity which is calculated on the basis of the luminance for a first feature point included in the first group with second feature quantity of a second feature point included in the third group and second comparison of third feature quantity which is calculated on the basis of the hue for a third feature point included in the second group with fourth feature quantity of a fourth feature point included in the fourth group.

2. The image similarity determination apparatus according to claim 1, wherein the selection is executed, for each feature point, in accordance with comparison of luminance information in a surrounding region of each feature point with hue information in the surrounding region.

3. The image similarity determination apparatus according to claim 2, wherein the luminance information is a first index based on an absolute value of a luminance difference between pixels included in the surrounding region and hue information is a second index based on an absolute value of a hue difference between pixels included in the surrounding region.

4. The image similarity determination apparatus according to claim 3, wherein when a value of the first index regarding a certain feature point included in the first image is no less than a first threshold value, and a value of the second index regarding the certain feature point is less than a second threshold value, the certain feature point is selected as the first group.

5. The image similarity determination apparatus according to claim 3, wherein when a value of the first index regarding a certain feature point included in the first image is larger than a value of the second index regarding the certain feature point, the certain feature point is selected as the first group.

6. The image similarity determination apparatus according to claim 3, wherein when a value of the first index regarding a certain feature point included in the first image is smaller than a first threshold value, and a value of the second index regarding the certain feature point is smaller than a second threshold value, the certain feature point is selected as neither of the first group and the second group.

7. A computer-implemented image similarity determination method comprising:
   acquiring a first image and a second image;
   performing selection of a first group and a second group from a plurality of feature points included in the first image and performing selection of a third group and a fourth group from a plurality of feature points included in the second image;
   calculating feature quantity for each feature point included in the first group and the third group on the basis of luminance and calculating feature quantity for each feature point included in the second group and the fourth group on the basis of hue; and
   determining similarity between the first image and the second image on the basis of both first comparison of first feature quantity which is calculated on the basis of the luminance for a first feature point included in the first group with second feature quantity of a second feature point included in the third group and second comparison of third feature quantity which is calculated on the basis of the hue for a third feature point included in the second group with fourth feature quantity of a fourth feature point included in the fourth group.

8. The image similarity determination method according to claim 7, wherein the selection is executed, for each feature point, in accordance with comparison of luminance information in a surrounding region of each feature point with hue information in the surrounding region.

9. The image similarity determination method according to claim 8, wherein the luminance information is a first index based on an absolute value of a luminance difference between pixels included in the surrounding region and hue information is a second index based on an absolute value of a hue difference between pixels included in the surrounding region.

10. The image similarity determination method according to claim 9, wherein when a value of the first index regarding a certain feature point included in the first image is no less than a first threshold value, and a value of the second index regarding the certain feature point is less than a second threshold value, the certain feature point is selected as the first group.

11. The image similarity determination method according to claim 9, wherein when a value of the first index regarding a certain feature point included in the first image is larger than a value of the second index regarding the certain feature point, the certain feature point is selected as the first group.

12. The image similarity determination method according to claim 9, wherein when a value of the first index regarding a certain feature point included in the first image is smaller than a first threshold value, and a value of the second index regarding the certain feature point is smaller than a second threshold value, the certain feature point is selected as neither of the first group and the second group.

13. A non-transitory computer-readable medium storing an image similarity determination program that causes a computer to execute a process comprising:
   acquiring a first image and a second image;
   performing selection of a first group and a second group from a plurality of feature points included in the first image and performing selection of a third group and a fourth group from a plurality of feature points included in the second image;
   calculating feature quantity for each feature point included in the first group and the third group on the basis of luminance and calculating feature quantity for each feature point included in the second group and the fourth group on the basis of hue; and
   determining similarity between the first image and the second image on the basis of both first comparison of first feature quantity which is calculated on the basis of the luminance for a first feature point included in the first group with second feature quantity of a second feature point included in the third group and second comparison of third feature quantity which is calculated on the basis of the hue for a third feature point included in the second group with fourth feature quantity of a fourth feature point included in the fourth group.

14. The non-transitory computer-readable medium according to claim 13, wherein the selection is executed, for each feature point, in accordance with comparison of luminance information in a surrounding region of each feature point with hue information in the surrounding region.

15. The non-transitory computer-readable medium according to claim 14, wherein the luminance information is a first index based on an absolute value of a luminance difference between pixels included in the surrounding region and hue information is a second index based on an absolute value of a hue difference between pixels included in the surrounding region.

16. The non-transitory computer-readable medium according to claim 15, wherein when a value of the first index regarding a certain feature point included in the first image is no less than a first threshold value, and a value of the second index regarding the certain feature point is less than a second threshold value, the certain feature point is selected as the first group.

17. The non-transitory computer-readable medium according to claim 15, wherein when a value of the first index regarding a certain feature point included in the first image is larger than a value of the second index regarding the certain feature point, the certain feature point is selected as the first group.

18. The non-transitory computer-readable medium according to claim 15, wherein when a value of the first index regarding a certain feature point included in the first image is smaller than a first threshold value, and a value of the second index regarding the certain feature point is smaller than a second threshold value, the certain feature point is selected as neither of the first group and the second group.

* * * * *